US010452689B1

United States Patent
Gratton et al.

(10) Patent No.: US 10,452,689 B1
(45) Date of Patent: Oct. 22, 2019

(54) CONSOLIDATING INFORMATION FROM DIFFERENT SIGNALS INTO AN EVENT

(71) Applicant: Banjo, Inc., Park City, UT (US)

(72) Inventors: Christian Gratton, Las Vegas, NV (US); Damien Patton, Park City, UT (US); Rish Mehta, Redwood City, CA (US); KW Justin Leung, Redwood City, UT (US)

(73) Assignee: Banjo, Inc., Park City, UT (US)

( * ) Notice: Subject to any disclaimer, the term of this patent is extended or adjusted under 35 U.S.C. 154(b) by 0 days.

(21) Appl. No.: 16/284,834

(22) Filed: Feb. 25, 2019

Related U.S. Application Data

(60) Provisional application No. 62/654,274, filed on Apr. 6, 2018, provisional application No. 62/654,277, filed on Apr. 6, 2018, provisional application No. 62/664,001, filed on Apr. 27, 2018, provisional application No. 62/676,873, filed on May 25, 2018, provisional application No. 62/679,752, filed on Jun. 1, 2018, provisional application No. 62/682,176, filed on Jun. 8, 2018, provisional application No. 62/682,177, filed on Jun. 8, 2018, provisional application No. 62/685,289, filed on Jun. 15, 2018.

(51) Int. Cl.
| | | |
|---|---|---|
| *G06F 17/00* | (2019.01) | |
| *G06F 16/28* | (2019.01) | |
| *G06F 9/54* | (2006.01) | |
| *G06F 16/2455* | (2019.01) | |

(52) U.S. Cl.
CPC ........... *G06F 16/285* (2019.01); *G06F 9/542* (2013.01); *G06F 16/24552* (2019.01)

(58) Field of Classification Search
CPC ........... G06F 16/24568; G06F 16/2455; G06F 16/1756; G06F 16/1748; G06F 16/1744; G06F 11/1453; G06F 11/1464
USPC ........................................ 707/692, 664, 616
See application file for complete search history.

(56) References Cited

U.S. PATENT DOCUMENTS

| | | | | |
|---|---|---|---|---|
| 6,697,810 | B2 * | 2/2004 | Kumar ................ | G06F 11/0709 |
| 2002/0156785 | A1 * | 10/2002 | Kumar ................ | G06F 11/0709 |
| 2009/0043881 | A1 * | 2/2009 | Alstad ................ | G06F 12/0813 |
| | | | | 709/224 |
| 2015/0261776 | A1 * | 9/2015 | Attarde ............... | G06F 16/1748 |
| | | | | 707/664 |

(Continued)

*Primary Examiner* — Jean M Corrielus
(74) *Attorney, Agent, or Firm* — Michael B. Dodd; R. Jace Hirschi

(57) ABSTRACT

The present invention extends to methods, systems, and computer program products for consolidating information from different signals into an event. Aspects of the invention used a multiphase approach to consolidating information from different signals into (e.g., deduplicating) an event. Detected events are held in the event holding cache for some amount of time after detection in accordance event holding criteria. As events are detected, an information consolidator compares currently detected events to previously cached events. Events determined to be the same event are grouped into an event group. When holding criteria expire for an event in the event group, the event group is published to one or more entities. As such, each new detection of the event does not trigger a corresponding new notification. Different portions of content from the same signal can also be monitored to reduce duplicate detections based on different content types in the same signal.

14 Claims, 18 Drawing Sheets

(56) References Cited

U.S. PATENT DOCUMENTS

| | | | |
|---|---|---|---|
| 2015/0261792 A1* | 9/2015 | Attarde | G06F 16/215 |
| | | | 707/616 |
| 2016/0093338 A1* | 3/2016 | Laska | G06K 9/00711 |
| | | | 386/224 |
| 2016/0239511 A1* | 8/2016 | Therrien | G06F 16/1748 |
| 2016/0253351 A1* | 9/2016 | Hansen | G06F 16/1744 |
| | | | 707/692 |
| 2017/0212907 A1* | 7/2017 | VanderSpek | G06F 16/1748 |
| 2017/0346915 A1* | 11/2017 | Gay | H04L 67/2852 |

* cited by examiner

CONSOLIDATING INFORMATION FROM DIFFERENT SIGNALS INTO AN EVENT

CROSS-REFERENCE TO RELATED APPLICATIONS

This application claims the benefit of U.S. Provisional Patent Application Ser. No. 62/654,274, entitled "Detecting Events From Multiple Signals", filed Apr. 6, 2018 which is incorporated herein in its entirety. This application claims the benefit of U.S. Provisional Patent Application Ser. No. 62/654,277 entitled, "Validating Possible Events With Additional Signals", filed Apr. 6, 2018 which is incorporated herein in its entirety. This application claims the benefit of U.S. Provisional Patent Application Ser. No. 62/664,001, entitled, "Normalizing Different Types Of Ingested Signals Into A Common Format", filed Apr. 27, 2018. This application claims the benefit of U.S. Provisional Patent Application Ser. No. 62/676,873 entitled "Deduplicating Events", filed May 25, 2018 which is incorporated herein in its entirety. This application claims the benefit of U.S. Provisional Patent Application Ser. No. 62/679,752 entitled "Multi-Stage Event Deduplication", filed Jun. 1, 2018 which is incorporated herein in its entirety. This application claims the benefit of U.S. Provisional Patent Application Ser. No. 62/682,176 entitled "Detecting An Event From Multiple Sources", filed Jun. 8, 2018 which is incorporated herein in its entirety. This application claims the benefit of U.S. Provisional Patent Application Ser. No. 62/682,177 entitled "Detecting An Event From Multi-Source Event Probability", filed Jun. 8, 2018 which is incorporated herein in its entirety. This application claims the benefit of U.S. Provisional Patent Application Ser. No. 62/685,289 entitled "Deduplicating Events", filed Jun. 15, 2018 which is incorporated herein in its entirety.

BACKGROUND

1. Background and Relevant Art

Entities (e.g., parents, guardians, friends, relatives, teachers, social workers, first responders, hospitals, delivery services, media outlets, government entities, etc.) may desire to be made aware of relevant events (e.g., fires, accidents, police presence, shootings, etc.). However, entities typically are not made aware of an event until after a person observes the event (or the event aftermath) and calls authorities.

In general, techniques that attempt to automate event detection are unreliable. Some techniques have attempted to mine social media data to detect the planning of events and forecast when events might occur. However, events can occur without prior planning and/or may not be detectable using social media data. Further, these techniques are not capable of meaningfully processing available data nor are these techniques capable of differentiating false data (e.g., hoax social media posts)

Other techniques use textual comparisons to compare textual content (e.g., keywords) in a data stream to event templates in a database. If text in a data stream matches keywords in an event template, the data stream is labeled as indicating an event.

BRIEF SUMMARY

Examples extend to methods, systems, and computer program products for consolidating information from different signals into an event. An event is detected from content of a normalized signal. The vent is compared to events in an event holding cache. It is determined that the event is not a redetection of a cached event. The event is cached in an event holding cache until a specified holding period expires.

Another event is detected from content of another normalized signal. The other event is compared to cached events in the event holding cache, including comparing the other event to the event. It is determined that the other event is a redetection of the event. The event and the other event are grouped into an event group.

The event group, including the event and the other event, is published to a recipient when the specified holding period expires. The event and the other event are removed from the event holding cache (and possibly moved to a sent group cache) concurrently with publishing the event group.

It may also be that a further event is detected from content of a further normalized signal. The further event can be compared to one or more event groups cached in the sent groups cache, including comparing the further event to the event group. It is determined that the further event belongs to the event group. The further event is published to the recipient to supplement publication of the event group.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1A:
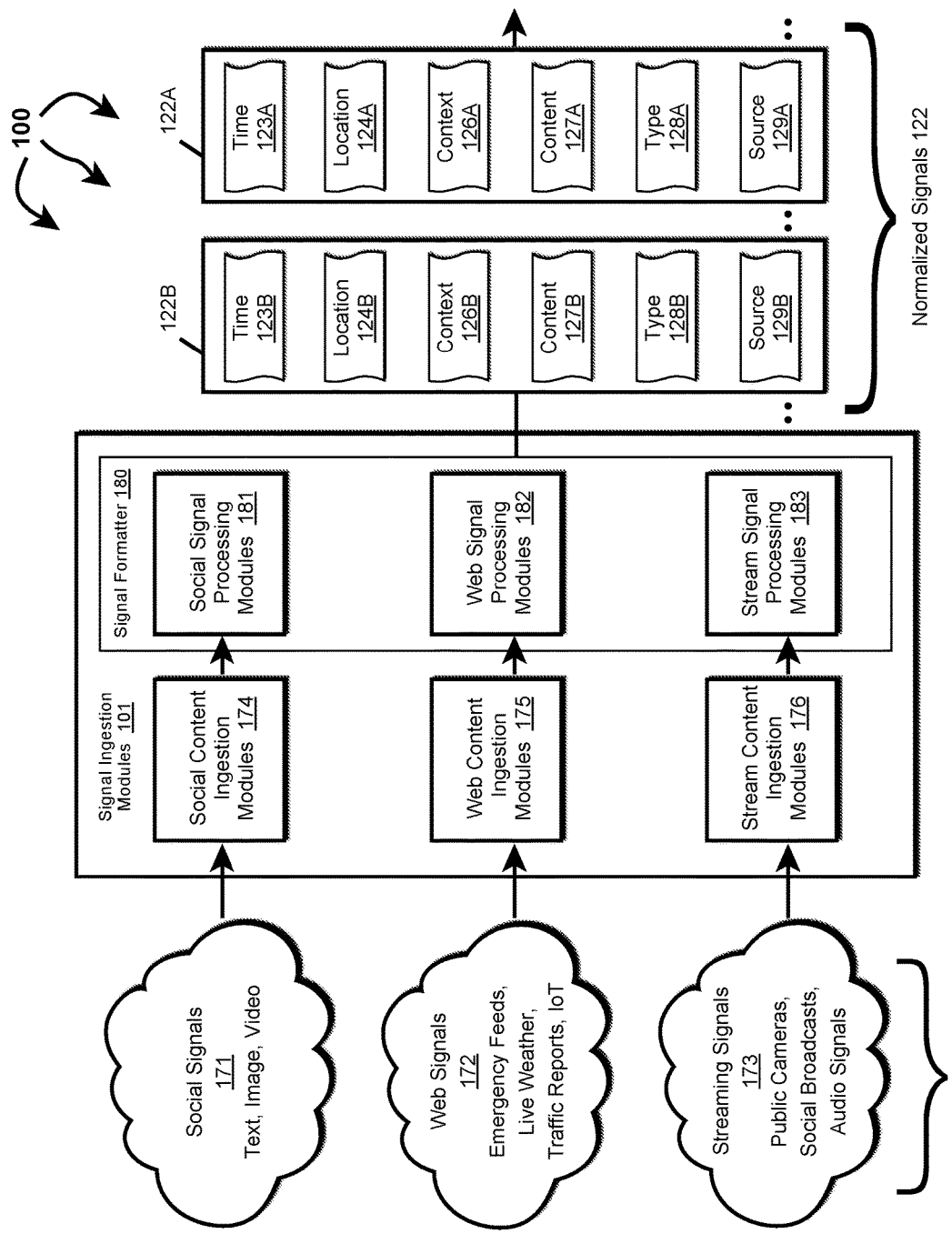
FIG. 1A illustrates an example computer architecture that facilitates normalizing ingesting signals.

Examples extend to methods, systems, and computer program products for consolidating information from different signals into an event.

In general, individuals and organizations can be interested in events associated with other individuals and organizations. For example, entities (e.g., parents, other family members, guardians, friends, teachers, social workers, first responders, hospitals, delivery services, media outlets, co-workers, government entities, security personnel, government agencies, businesses, etc.) may desire to be made aware of relevant events as close as possible to the events' occurrence (i.e., as close as possible to "moment zero"). Events can be detected from different types of ingested signals, such as, for example, social media signals, web signals, and streaming signals.

Further, while entities desire to be notified of events, they typically do not want to be repeatedly notified of the same event. However, the same event may be detected (and re-detected) based on information received from different sources at different times. For example, an event can be detected from first information at a first time. One or more recipient entities can be notified of the detected event. Subsequently, the event can be (re)detected from second information at a later second time. Geographically wide-ranging events (e.g., natural disasters) or serious events (e.g., large fires, active shooters, etc.) may be detected multiple times based on information from many sources. However, sending multiple notifications of the same event to recipient entities is an inefficient use of resources and also degrades recipient user experience, and can lead to reduced use or disuse of detection capability.

Accordingly, aspects of the invention used a multiphase approach to consolidating information from different (e.g., deduplicating) signals into an event. An event infrastructure maintains an event holding cache. Detected events are held in the event holding cache for some amount of time after detection in accordance with configurable event holding criteria. Event holding criteria can be based on, for example, a specified time interval, current processing times, available processing resources, etc. As events are detected, a duplicate detector compares currently detected events to previously cached events. Events determined to be the same event are grouped into an event group. Many events can be accumulated into an event group. When holding criteria expire for an event in the event group, the event group is published to one or more entities (i.e., the one or more entities are notification of the event). As such, each new detection of the event does not trigger a corresponding new notification.

However, there is some chance that an event is (re)detected after an event group has been published to one or more recipient entities. As such, the event infrastructure can also maintain a sent group cache. The sent group cache stores an indication of event groups published to one or more recipient entities. When an event group is published to recipient entities, an indication of the publication and the event group can be cached in the sent group cache. Indications of event group publications are held in the sent group cache for some amount of time in accordance with configurable group holding criteria. Group holding criteria can be based on, for example, a specified time interval, group creation times, current processing times, available processing resources, etc. Group holding criteria can differ from event holding criteria. In one aspect, indications of event group publications are held in sent group cache for somewhat longer than events are held in event holding cache.

Thus, when a new event is detected, the duplicate detector also compares the detected event to indications of published event groups in the sent group cache. In one aspect, a detected event is determined to be a (re)detection of a prior event and belongs to a cached event group. When an event belongs to a cached event group, the event can be published to recipient entities to supplement a previous publication of the event group. Supplementing previous publication of an event group has reduced resource impact and limits user experience degradation relative to publishing a "new" event notification. For example, a user interface screen may increment to show a new detection of the same event, which is less impactful than presenting a pop-up window or other user interface components to draw attention to a new event.

Users can configure how they want to be notified of new events and/or notified of event updates (i.e., notifications of event redetections). Users can configure notifications of new events the same or differently than notifications of event updates. A user may choose to ignore event updates.

In one aspect, newly detected events are checked for inclusion in cached event groups in a sent group cache prior to being checked for grouping with other events in the event holding cache.

In general, signal ingestion modules ingest different types of raw structured and/or raw unstructured signals on an ongoing basis. Different types of signals can include different data media types and different data formats. Data media types can include audio, video, image, and text. Different formats can include text in XML, text in JavaScript Object Notation (JSON), text in RSS feed, plain text, video stream in Dynamic Adaptive Streaming over HTTP (DASH), video stream in HTTP Live Streaming (HLS), video stream in Real-Time Messaging Protocol (RTMP), other Multipurpose Internet Mail Extensions (MIME) types, etc. Handling different types and formats of data introduces inefficiencies into subsequent event detection processes, including when determining if different signals relate to the same event.

Accordingly, the signal ingestion modules can normalize raw signals across multiple data dimensions to form normalized signals. Each dimension can be a scalar value or a vector of values. In one aspect, raw signals are normalized into normalized signals having a Time, Location, Context (or "TLC") dimensions.

A Time (T) dimension can include a time of origin or alternatively a "event time" of a signal. A Location (L) dimension can include a location anywhere across a geographic area, such as, a country (e.g., the United States), a State, a defined area, an impacted area, an area defined by a geo cell, an address, etc.

A Context (C) dimension indicates circumstances surrounding formation/origination of a raw signal in terms that facilitate understanding and assessment of the raw signal. The Context (C) dimension of a raw signal can be derived from express as well as inferred signal features of the raw signal.

Signal ingestion modules can include one or more single source classifiers. A single source classifier can compute a single source probability for a raw signal from features of the raw signal. A single source probability can reflect a mathematical probability or approximation of a mathematical probability (e.g., a percentage between 0%-100%) of an event actually occurring. A single source classifier can be configured to compute a single source probability for a single event type or to compute a single source probability for each of a plurality of different event types. A single source classifier can compute a single source probability using artificial intelligence, machine learning, neural networks, logic, heuristics, etc.

As such, single source probabilities and corresponding probability details can represent a Context (C) dimension. Probability details can indicate (e.g., can include a hash field indicating) a probabilistic model and (express and/or inferred) signal features considered in a signal source probability calculation.

Thus, per signal type, signal ingestion modules determine Time (T), a Location (L), and a Context (C) dimensions associated with a signal. Different ingestion modules can be utilized/tailored to determine T, L, and C dimensions associated with different signal types. Normalized (or "TLC") signals can be forwarded to an event detection infrastructure. When signals are normalized across common dimensions subsequent event detection is more efficient and more effective.

Normalization of ingestion signals can include dimensionality reduction. Generally, "transdimensionality" transformations can be structured and defined in a "TLC" dimensional model. Signal ingestion modules can apply the "transdimensionality" transformations to generic source data in raw signals to re-encode the source data into normalized data having lower dimensionality. Dimensionality reduction can include reducing dimensionality (e.g., hundreds, thousands, or even more signal features (dimensions)) of a raw signal into a normalized signal including a T vector, an L vector, and a C vector. At lower dimensionality, the complexity of measuring "distances" between dimensional vectors across different normalized signals is reduced.

Concurrently with signal ingestion, an event detection infrastructure considers features of different combinations of normalized signals to attempt to identify events. For example, the event detection infrastructure can determine that features of multiple different normalized signals collectively indicate an event. Alternately, the event detection infrastructure can determine that features of one or more normalized signals indicate a possible event. The event detection infrastructure then determines that features of one or more other normalized signals validate the possible event. Signal features can include: signal type, signal source, signal content, Time (T) dimension, Location (L) dimension, Context (C) dimension, other circumstances of signal creation, etc.

The event detection infrastructure can send detected events to an event notification module. The event notification module (potentially through interoperation with the event detection infrastructure) can consolidate information from different signals into (e.g., deduplicate) events and notify entities of events as described. Consolidating information from different signals (e.g., deduplicating) can reduce computer system and network resource consumption.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: raw signals, normalized signals, signal features, single source probabilities, times, time dimensions, locations, location dimensions, geo cells, geo cell entries, designated market areas (DMAs), contexts, location annotations, context annotations, classification tags, context dimensions, events, possible events, event notification preferences, event notifications, signal features, aggregated signal features, thresholds, event holding preferences, group holding preferences, holding periods, event groups, event updates, identifiers, model pipeline output, aggregated output, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, raw signals, normalized signals, signal features, single source probabilities, times, time dimensions, locations, location dimensions, geo cells, geo cell entries, designated market areas (DMAs), contexts, location annotations, context annotations, classification tags, context dimensions, events, event notification preferences, event notifications, signal features, aggregated signal features, thresholds, event holding preferences, group holding preferences, holding periods, event groups, event updates, identifiers, model pipeline output, aggregated output, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for a higher speed detection or artificial intelligence that can enable signal processing. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, a "geo cell" is defined as a piece of "cell" in a spatial grid in any form. In one aspect, geo cells are arranged in a hierarchical structure. Cells of different geometries can be used.

A "geohash" is an example of a "geo cell".

In this description and the following claims, "geohash" is defined as a geocoding system which encodes a geographic location into a short string of letters and digits. Geohash is a hierarchical spatial data structure which subdivides space into buckets of grid shape (e.g., a square). Geohashes offer properties like arbitrary precision and the possibility of gradually removing characters from the end of the code to reduce its size (and gradually lose precision). As a consequence of the gradual precision degradation, nearby places will often (but not always) present similar prefixes. The longer a shared prefix is, the closer the two places are. geo cells can be used as a unique identifier and to approximate point data (e.g., in databases).

In one aspect, a "geohash" is used to refer to a string encoding of an area or point on the Earth. The area or point on the Earth may be represented (among other possible coordinate systems) as a latitude/longitude or Easting/Northing—the choice of which is dependent on the coordinate system chosen to represent an area or point on the Earth. geo cell can refer to an encoding of this area or point, where the geo cell may be a binary string comprised of 0s and 1s corresponding to the area or point, or a string comprised of 0s, 1s, and a ternary character (such as X)—which is used to refer to a don't care character (0 or 1). A geo cell can also be represented as a string encoding of the area or point, for example, one possible encoding is base-32, where every 5 binary characters are encoded as an ASCII character.

Depending on latitude, the size of an area defined at a specified geo cell precision can vary. When geohash is used for spatial indexing, the areas defined at various geo cell precisions are approximately:

TABLE 1

Example Areas at Various Geohash Precisions

| Geohash Length/Precision | width × height |
| --- | --- |
| 1 | 5,009.4 km × 4,992.6 km |
| 2 | 1,252.3 km × 624.1 km |
| 3 | 156.5 km × 156 km |
| 4 | 39.1 km × 19.5 km |
| 5 | 4.9 km × 4.9 km |
| 6 | 1.2 km × 609.4 m |
| 7 | 152.9 m × 152.4 m |
| 8 | 38.2 m × 19 m |
| 9 | 4.8 m × 4.8 m |
| 10 | 1.2 m × 59.5 cm |
| 11 | 14.9 cm × 14.9 cm |
| 12 | 3.7 cm × 1.9 cm |

Other geo cell geometries, such as, hexagonal tiling, triangular tiling, etc. are also possible. For example, the H3 geospatial indexing system is a multi-precision hexagonal tiling of a sphere (such as the Earth) indexed with hierarchical linear indexes.

In another aspect, geo cells are a hierarchical decomposition of a sphere (such as the Earth) into representations of regions or points based a Hilbert curve (e.g., the S2 hierarchy or other hierarchies). Regions/points of the sphere can be projected into a cube and each face of the cube includes a quad-tree where the sphere point is projected into. After that, transformations can be applied and the space discretized. The geo cells are then enumerated on a Hilbert Curve (a space-filling curve that converts multiple dimensions into one dimension and preserves the approximate locality).

Due to the hierarchical nature of geo cells, any signal, event, entity, etc., associated with a geo cell of a specified precision is by default associated with any less precise geo cells that contain the geo cell. For example, if a signal is associated with a geo cell of precision 9, the signal is by default also associated with corresponding geo cells of precisions 1, 2, 3, 4, 5, 6, 7, and 8. Similar mechanisms are applicable to other tiling and geo cell arrangements. For example, S2 has a cell level hierarchy ranging from level zero (85,011,012 km$^2$) to level 30 (between 0.48 cm$^2$ to 0.96 cm$^2$).

Signal Ingestion and Normalization

Signal ingestion modules ingest a variety of raw structured and/or raw unstructured signals on an on going basis and in essentially real-time. Raw signals can include social posts, live broadcasts, traffic camera feeds, other camera feeds (e.g., from other public cameras or from CCTV cameras), listening device feeds, 911 calls, weather data, planned events, IoT device data, crowd sourced traffic and road information, satellite data, air quality sensor data, smart city sensor data, public radio communication (e.g., among first responders and/or dispatchers, between air traffic controllers and pilots), subscription data services, etc. The content of raw signals can include images, video, audio, text, etc.

In general, signal normalization can prepare (or preprocess) raw signals into normalized signals to increase efficiency and effectiveness of subsequent computing activities, such as, event detection, event notification, etc., that utilize the normalized signals. For example, signal ingestion modules can normalize raw signals into normalized signals having a Time, Location, and Context (TLC) dimensions. An event detection infrastructure can use the Time, Location, and Content dimensions to more efficiently and effectively detect events.

Per signal type and signal content, different normalization modules can be used to extract, derive, infer, etc. Time, Location, and Context dimensions from/for a raw signal. For example, one set of normalization modules can be configured to extract/derive/infer Time, Location and Context dimensions from/for social signals. Another set of normalization modules can be configured to extract/derive/infer Time, Location and Context dimensions from/for Web signals. A further set of normalization modules can be configured to extract/derive/infer Time, Location and Context dimensions from/for streaming signals.

Normalization modules for extracting/deriving/inferring Time, Location, and Context dimensions can include text processing modules, NLP modules, image processing modules, video processing modules, etc. The modules can be used to extract/derive/infer data representative of Time, Location, and Context dimensions for a signal. Time, Location, and Context dimensions for a signal can be extracted/derived/inferred from metadata and/or content of the signal.

For example, NLP modules can analyze metadata and content of a sound clip to identify a time, location, and keywords (e.g., fire, shooter, etc.). An acoustic listener can also interpret the meaning of sounds in a sound clip (e.g., a gunshot, vehicle collision, etc.) and convert to relevant context. Live acoustic listeners can determine the distance and direction of a sound. Similarly, image processing modules can analyze metadata and pixels in an image to identify a time, location and keywords (e.g., fire, shooter, etc.). Image processing modules can also interpret the meaning of parts of an image (e.g., a person holding a gun, flames, a store logo, etc.) and convert to relevant context. Other modules can perform similar operations for other types of content including text and video.

Per signal type, each set of normalization modules can differ but may include at least some similar modules or may share some common modules. For example, similar (or the same) image analysis modules can be used to extract named entities from social signal images and public camera feeds. Likewise, similar (or the same) NLP modules can be used to extract named entities from social signal text and web text.

In some aspects, an ingested signal includes sufficient expressly defined time, location, and context information upon ingestion. The expressly defined time, location, and context information is used to determine Time, Location, and Context dimensions for the ingested signal. In other aspects, an ingested signal lacks expressly defined location information or expressly defined location information is insufficient (e.g., lacks precision) upon ingestion. In these other aspects, Location dimension or additional Location dimension can be inferred from features of an ingested signal and/or through references to other data sources. In further aspects, an ingested signal lacks expressly defined context information or expressly defined context information is insufficient (e.g., lacks precision) upon ingestion. In these further aspects, Context dimension or additional Context dimension can be inferred from features of an ingested signal and/or through reference to other data sources.

In further aspects, time information may not be included, or included time information may not be given with high enough precision and Time dimension is inferred. For example, a user may post an image to a social network which had been taken some indeterminate time earlier.

Normalization modules can use named entity recognition and reference to a geo cell database to infer Location dimension. Named entities can be recognized in text, images, video, audio, or sensor data. The recognized named entities can be compared to named entities in geo cell entries. Matches indicate possible signal origination in a geographic area defined by a geo cell.

As such, a normalized signal can include a Time dimension, a Location dimension, a Context dimension (e.g., single source probabilities and probability details), a signal type, a signal source, and content.

A single source probability can be calculated by single source classifiers (e.g., machine learning models, artificial intelligence, neural networks, statistical models, etc.) that consider hundreds, thousands, or even more signal features (dimensions) of a signal. Single source classifiers can be based on binary models and/or multi-class models.

FIG. 1A depicts part of computer architecture 100 that facilitates ingesting and normalizing signals. As depicted, computer architecture 100 includes signal ingestion modules 101, social signals 171, Web signals 172, and streaming signals 173. Signal ingestion modules 101, social signals 171, Web signals 172, and streaming signals 173 can be connected to (or be part of) a network, such as, for example, a system bus, a Local Area Network ("LAN"), a Wide Area Network ("WAN"), and even the Internet. Accordingly, signal ingestion modules 101, social signals 171, Web signals 172, and streaming signals 173 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Signal ingestion module(s) 101 can ingest raw signals 121, including social signals 171, web signals 172, and streaming signals 173, on an on going basis and in essentially real-time. Raw signals 121 can include social posts, traffic camera feeds, other camera feeds, listening device feeds, 911 calls, weather data, planned events, IoT device data, crowd sourced traffic and road information, satellite data, air quality sensor data, smart city sensor data, public radio communication, subscription data service data, etc. As such, potentially thousands, millions or even billions of unique raw signals, each with unique characteristics, are can be ingested and used determine event characteristics, such as, event truthfulness, event severity, event category or categories, etc.

Signal ingestion module(s) 101 include social content ingestion modules 174, web content ingestion modules 176, stream content ingestion modules 176, and signal formatter 180. Signal formatter 180 further includes social signal processing module 181, web signal processing module 182, and stream signal processing modules 183.

For each type of signal, a corresponding ingestion module and signal processing module can interoperate to normalize the signal into a Time, Location, Context (TLC) dimensions. For example, social content ingestion modules 174 and social signal processing module 181 can interoperate to normalize social signals 171 into TLC dimensions. Similarly, web content ingestion modules 176 and web signal processing module 182 can interoperate to normalize web signals 172 into TLC dimensions. Likewise, stream content ingestion modules 176 and stream signal processing modules 183 can interoperate to normalize streaming signals 173 into TLC dimensions.

In one aspect, signal content exceeding specified size requirements (e.g., audio or video) is cached upon ingestion. Signal ingestion modules 101 include a URL or other identifier to the cached content within the context for the signal.

In one aspect, signal formatter 180 includes modules for determining a single source probability as a ratio of signals turning into events based on the following signal properties: (1) event class (e.g., fire, accident, weather, etc.), (2) media type (e.g., text, image, audio, etc.), (3) source (e.g., twitter, traffic camera, first responder radio traffic, etc.), and (4) geo type (e.g., geo cell, region, or non-geo). Probabilities can be stored in a lookup table for different combinations of the signal properties. Features of a signal can be derived and used to query the lookup table. For example, the lookup table can be queried with terms ("accident", "image", "twitter", "region"). The corresponding ratio (probability) can be returned from the table.

In another aspect, signal formatter 180 includes a plurality of single source classifiers (e.g., artificial intelligence, machine learning modules, neural networks, etc.). Each single source classifier can consider hundreds, thousands, or even more signal features (dimensions) of a signal. Signal features of a signal can be derived and submitted to a signal source classifier. The single source classifier can return a probability that a signal indicates a type of event. Single source classifiers can be binary classifiers or multi-source classifiers.

Raw classifier output can be adjusted to more accurately represent a probability that a signal is a "true positive". For example, 1,000 signals whose raw classifier output is 0.9 may include 80% as true positives. Thus, probability can be adjusted to 0.8 to reflect true probability of the signal being a true positive. "Calibration" can be done in such a way that for any "calibrated score" this score reflects the true probability of a true positive outcome.

Signal ingestion modules 101 can insert one or more single source probabilities and corresponding probability details into a normalized signal to represent a Context (C) dimension. Probability details can indicate a probabilistic model and features used to calculate the probability. In one aspect, a probabilistic model and signal features are contained in a hash field.

Signal ingestion modules 101 can access "transdimensionality" transformations structured and defined in a "TLC" dimensional model. Signal ingestion modules 101 can apply the "transdimensionality" transformations to generic source data in raw signals to re-encode the source data into normalized data having lower dimensionality. Dimensionality reduction can include reducing dimensionality (e.g., hundreds, thousands, or even more signal features (dimensions)) of a raw signal into a normalized signal including a T vector, an L vector, and a C vector. At lower dimensionality, the complexity of measuring "distances" between dimensional vectors across different normalized signals is reduced.

Thus, in general, any received raw signals can be normalized into normalized signals including a Time (T) dimension, a Location (L) dimension, a Context (C) dimension, signal source, signal type, and content. Signal ingestion modules 101 can send normalized signals 122 to event detection infrastructure 103.

For example, signal ingestion modules 101 can send normalized signal 122A, including time 123A, location 124A, context 126A, content 127A, type 128A, and source 129A to event detection infrastructure 103. Similarly, signal ingestion modules 101 can send normalized signal 122B, including time 123B, location 124B, context 126B, content 127B, type 128B, and source 129B to event detection infrastructure 103.

Figure 2:
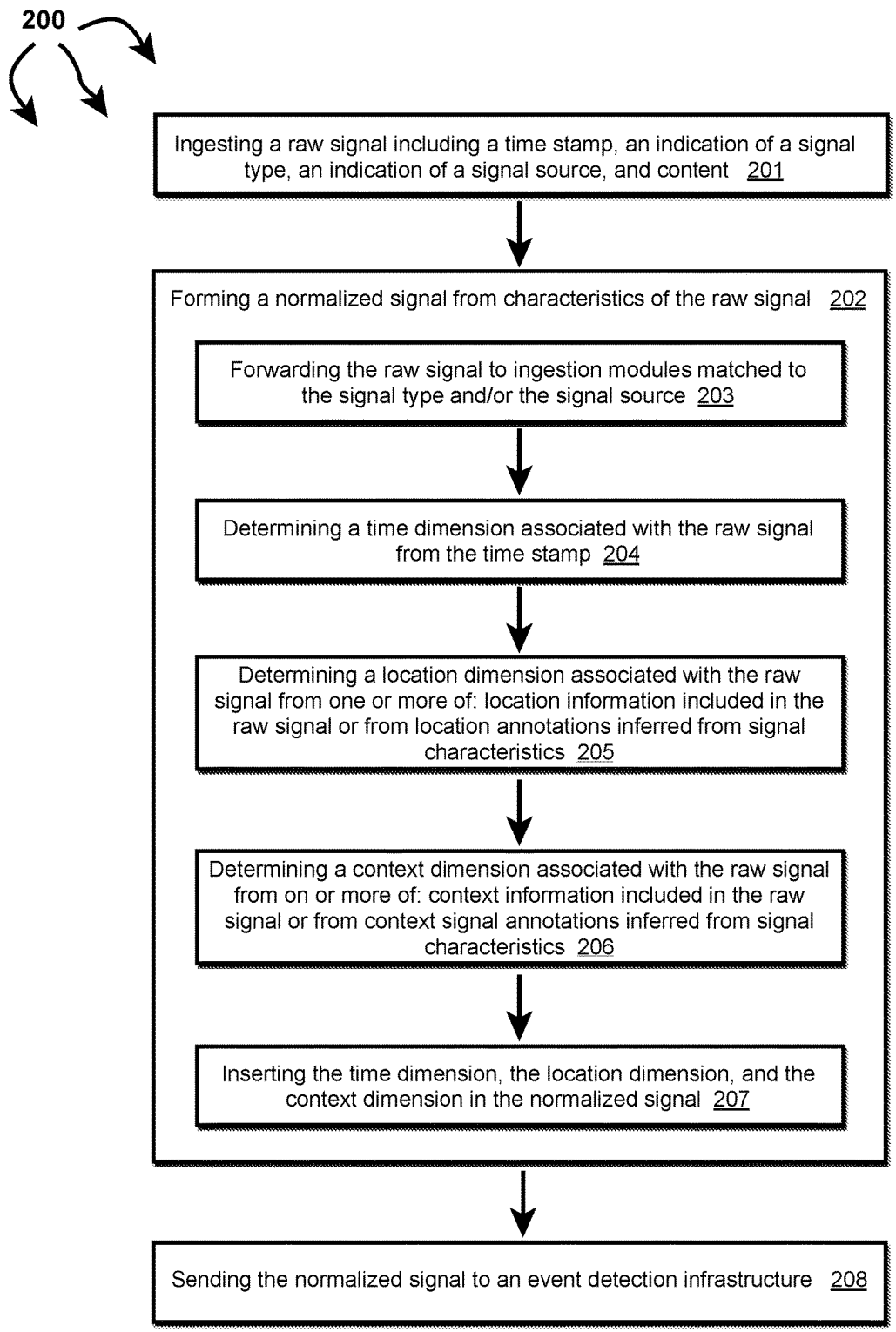
FIG. 2 illustrates a flow chart of an example method for normalizing ingested signals.

FIG. 2 illustrates a flow chart of an example method 200 for normalizing ingested signals. Method 200 will be described with respect to the components and data in computer architecture 100.

Method 200 includes ingesting a raw signal including a time stamp, an indication of a signal type, an indication of a signal source, and content (201). For example, signal ingestion modules 101 can ingest a raw signal 121 from one of: social signals 171, web signals 172, or streaming signals 173.

Method 200 includes forming a normalized signal from characteristics of the raw signal (202). For example, signal ingestion modules 101 can form a normalized signal 122A from the ingested raw signal 121.

Forming a normalized signal includes forwarding the raw signal to ingestion modules matched to the signal type and/or the signal source (203). For example, if ingested raw signal 121 is from social signals 171, raw signal 121 can be forwarded to social content ingestion modules 174 and social signal processing modules 181. If ingested raw signal 121 is from web signals 172, raw signal 121 can be forwarded to web content ingestion modules 175 and web signal processing modules 182. If ingested raw signal 121 is from streaming signals 173, raw signal 121 can be forwarded to streaming content ingestion modules 176 and streaming signal processing modules 183.

Forming a normalized signal includes determining a time dimension associated with the raw signal from the time stamp (204). For example, signal ingestion modules 101 can determine time 123A from a time stamp in ingested raw signal 121.

Forming a normalized signal includes determining a location dimension associated with the raw signal from one or more of: location information included in the raw signal or from location annotations inferred from signal characteristics (205). For example, signal ingestion modules 101 can determine location 124A from location information included in raw signal 121 or from location annotations derived from characteristics of raw signal 121 (e.g., signal source, signal type, signal content).

Forming a normalized signal includes determining a context dimension associated with the raw signal from one or more of: context information included in the raw signal or from context signal annotations inferred from signal characteristics (206). For example, signal ingestion modules 101 can determine context 126A from context information included in raw signal 121 or from context annotations derived from characteristics of raw signal 121 (e.g., signal source, signal type, signal content).

Forming a normalized signal includes inserting the time dimension, the location dimension, and the context dimension in the normalized signal (207). For example, signal ingestion modules 101 can insert time 123A, location 124A, and context 126A in normalized signal 122. Method 200 includes sending the normalized signal to an event detection infrastructure (208). For example, signal ingestion modules 101 can send normalized signal 122A to event detection infrastructure 103.

Figure 3A:
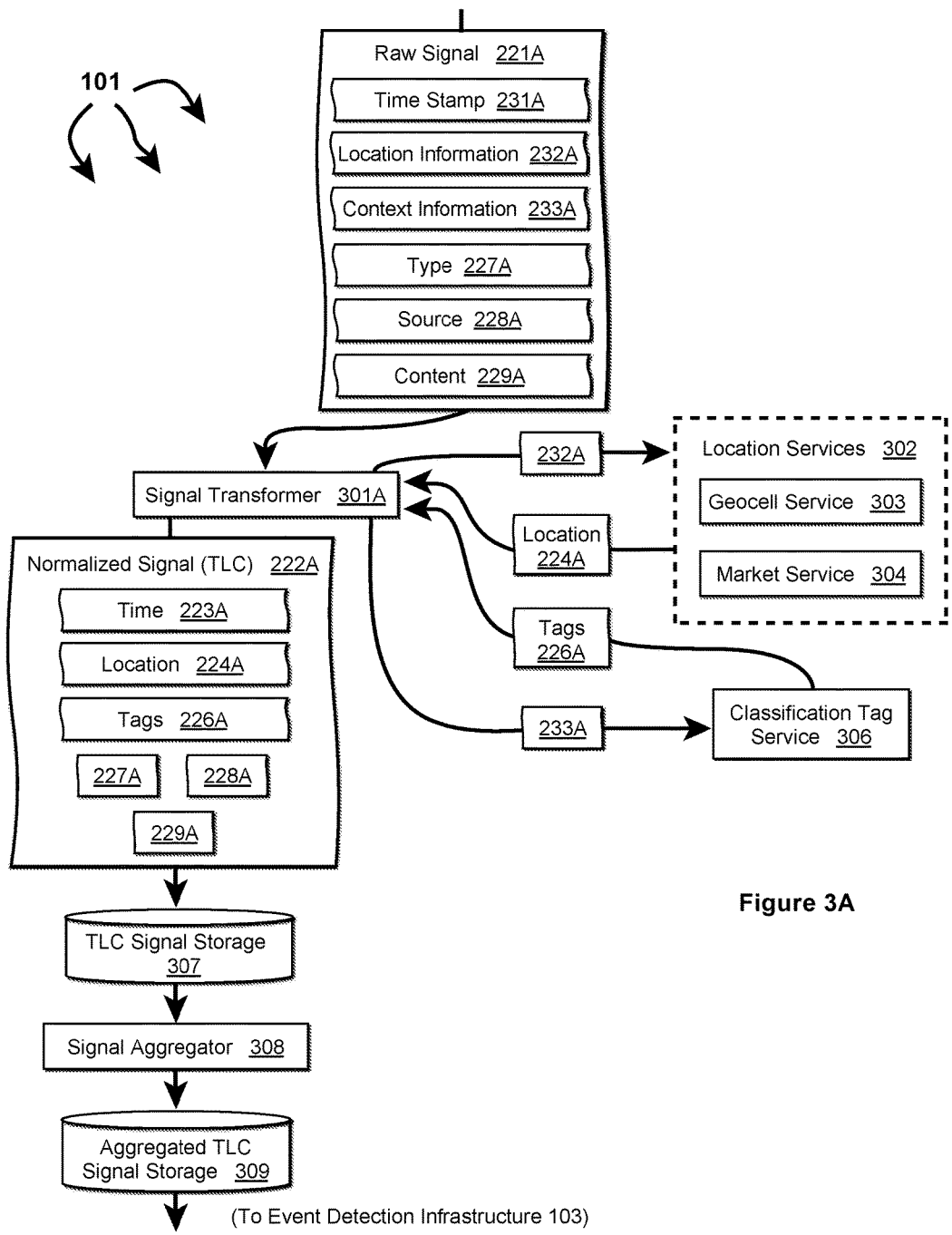
FIGS. 3A, 3B, and 3C illustrate other example components that can be included in signal ingestion modules.
Figure 3B:
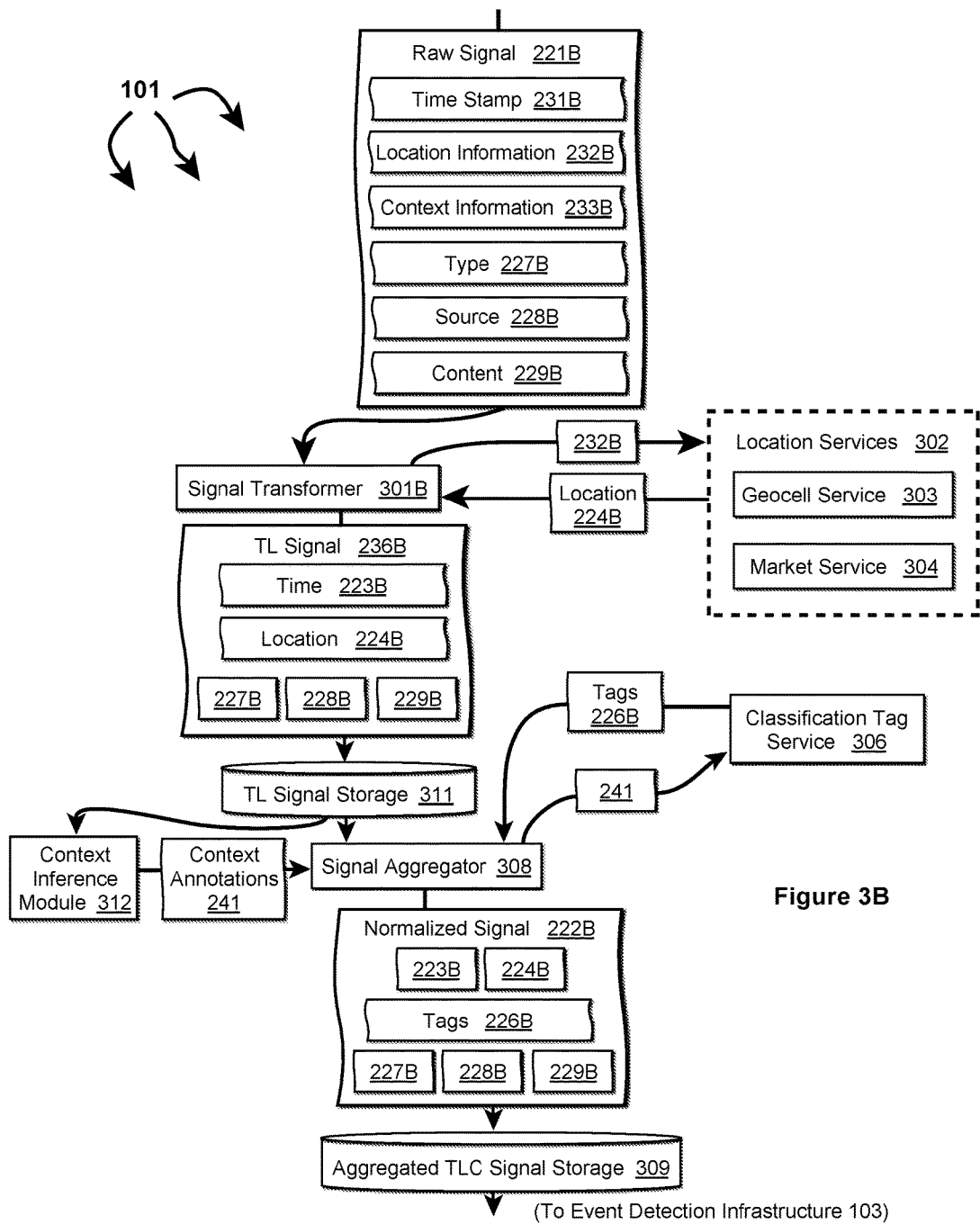
Figure 3C:
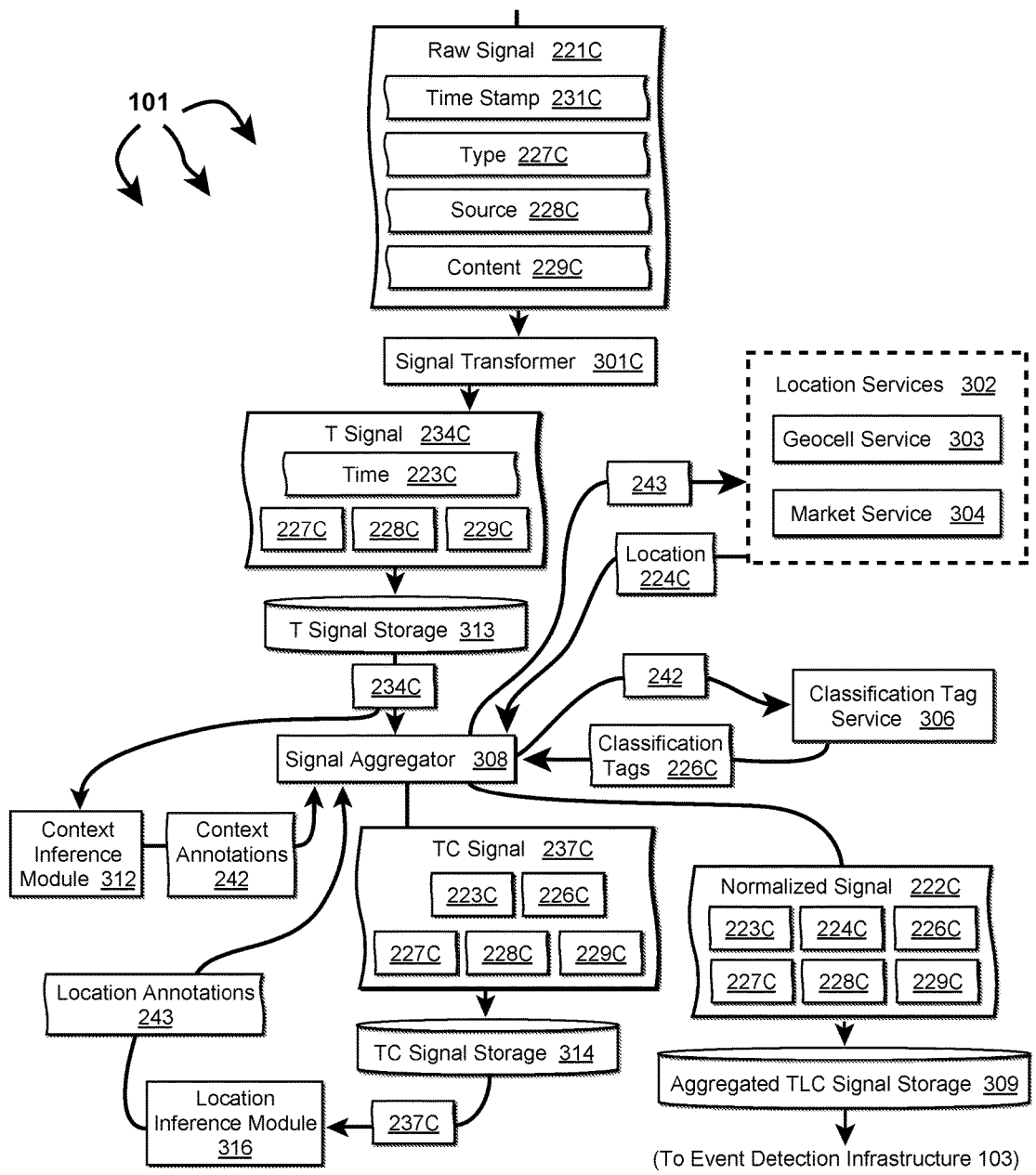

FIGS. 3A, 3B, and 3C depict other example components that can be included in signal ingestion modules 101. Signal ingestion modules 101 can include signal transformers for different types of signals including signal transformer 301A (for TLC signals), signal transformer 301B (for TL signals), and signal transformer 301C (for T signals). In one aspect, a single module combines the functionality of multiple different signal transformers.

Signal ingestion modules 101 can also include location services 302, classification tag service 306, signal aggregator 308, context inference module 312, and location inference module 316. Location services 302, classification tag service 306, signal aggregator 308, context inference module 312, and location inference module 316 or parts thereof can interoperate with and/or be integrated into any of ingestion modules 174, web content ingestion modules 176, stream content ingestion modules 176, social signal processing module 181, web signal processing module 182, and stream signal processing modules 183. Location services 302, classification tag service 306, signal aggregator 308, context inference module 312, and location inference module 316 can interoperate to implement "transdimensionality" transformations to reduce raw signal dimensionality into normalized TLC signals.

Signal ingestion modules 101 can also include storage for signals in different stages of normalization, including TLC signal storage 307, TL signal storage 311, T signal storage 313, TC signal storage 314, and aggregated TLC signal storage 309. In one aspect, data ingestion modules 101 implement a distributed messaging system. Each of signal storage 307, 309, 311, 313, and 314 can be implemented as a message container (e.g., a topic) associated with a type of message.

Figure 4:
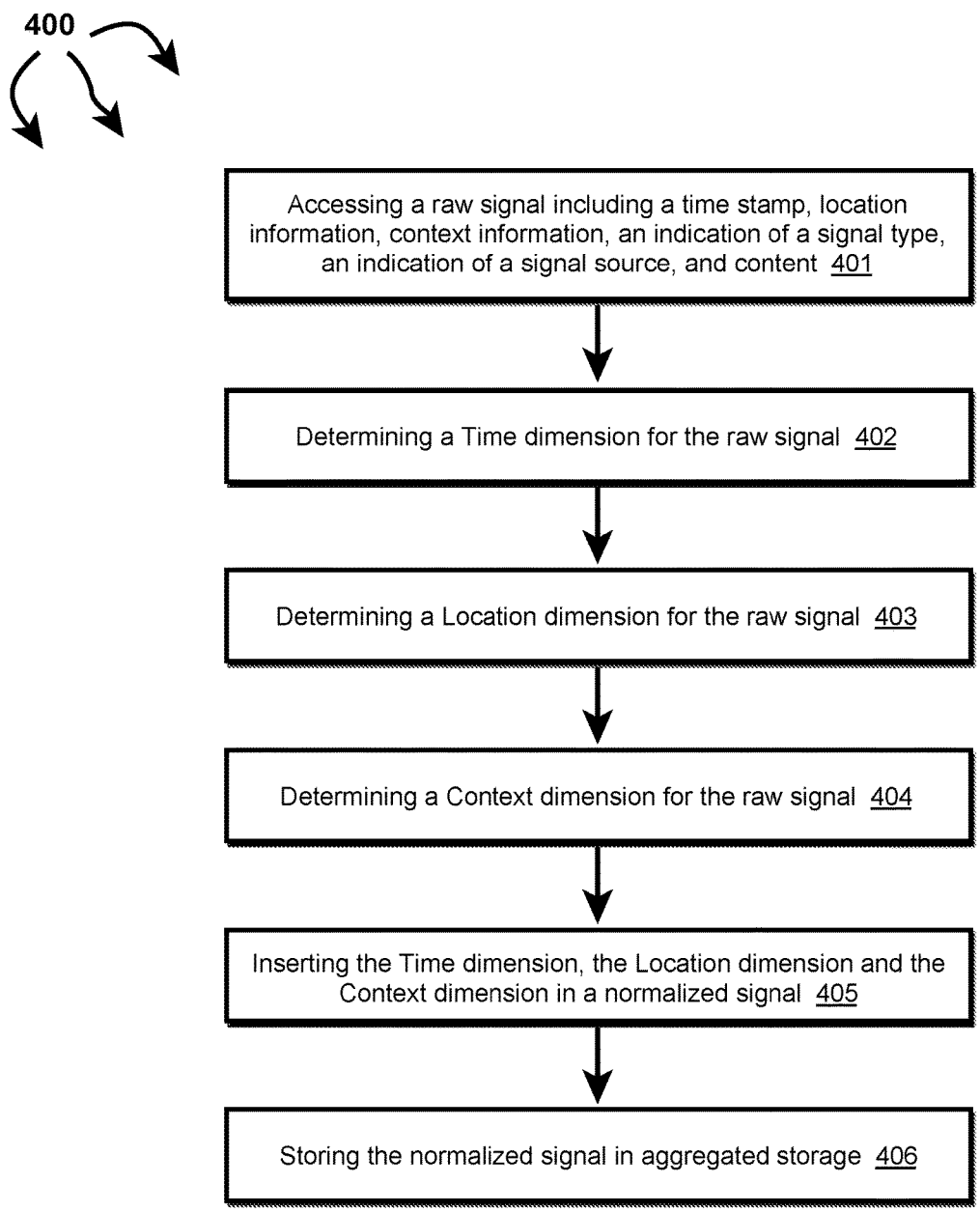
FIG. 4 illustrates a flow chart of an example method for normalizing an ingested signal including time information, location information, and context information.

FIG. 4 illustrates a flow chart of an example method 400 for normalizing an ingested signal including time information, location information, and context information. Method 400 will be described with respect to the components and data in FIG. 3A.

Method 400 includes accessing a raw signal including a time stamp, location information, context information, an indication of a signal type, an indication of a signal source, and content (401). For example, signal transformer 301A can access raw signal 221A. Raw signal 221A includes timestamp 231A, location information 232A (e.g., lat/lon, GPS coordinates, etc.), context information 233A (e.g., text expressly indicating a type of event), signal type 227A (e.g., social media, 911 communication, traffic camera feed, etc.), signal source 228A (e.g., Facebook, twitter, Waze, etc.), and signal content 229A (e.g., one or more of: image, video, text, keyword, locale, etc.).

Method 400 includes determining a Time dimension for the raw signal (402). For example, signal transformer 301A can determine time 223A from timestamp 231A.

Method 400 includes determining a Location dimension for the raw signal (403). For example, signal transformer 301A sends location information 232A to location services 302. Geo cell service 303 can identify a geo cell corresponding to location information 232A. Market service 304 can identify a designated market area (DMA) corresponding to location information 232A. Location services 302 can include the identified geo cell and/or DMA in location 224A. Location services 302 return location 224A to signal transformer 301.

Method 400 includes determining a Context dimension for the raw signal (404). For example, signal transformer 301A sends context information 233A to classification tag service 306. Classification tag service 306 identifies one or more classification tags 226A (e.g., fire, police presence, accident, natural disaster, etc.) from context information 233A. Classification tag service 306 returns classification tags 226A to signal transformer 301A.

Method 400 includes inserting the Time dimension, the Location dimension, and the Context dimension in a normalized signal (405). For example, signal transformer 301A can insert time 223A, location 224A, and tags 226A in normalized signal 222A (a TLC signal). Method 400 includes storing the normalized signal in signal storage (406). For example, signal transformer 301A can store normalized signal 222A in TLC signal storage 307. (Although not depicted, timestamp 231A, location information 232A, and context information 233A can also be included (or remain) in normalized signal 222A).

Method 400 includes storing the normalized signal in aggregated storage (406). For example, signal aggregator 308 can aggregate normalized signal 222A along with other normalized signals determined to relate to the same event. In one aspect, signal aggregator 308 forms a sequence of signals related to the same event. Signal aggregator 308 stores the signal sequence, including normalized signal 222A, in aggregated TLC storage 309 and eventually forwards the signal sequence to event detection infrastructure 103.

Figure 5:
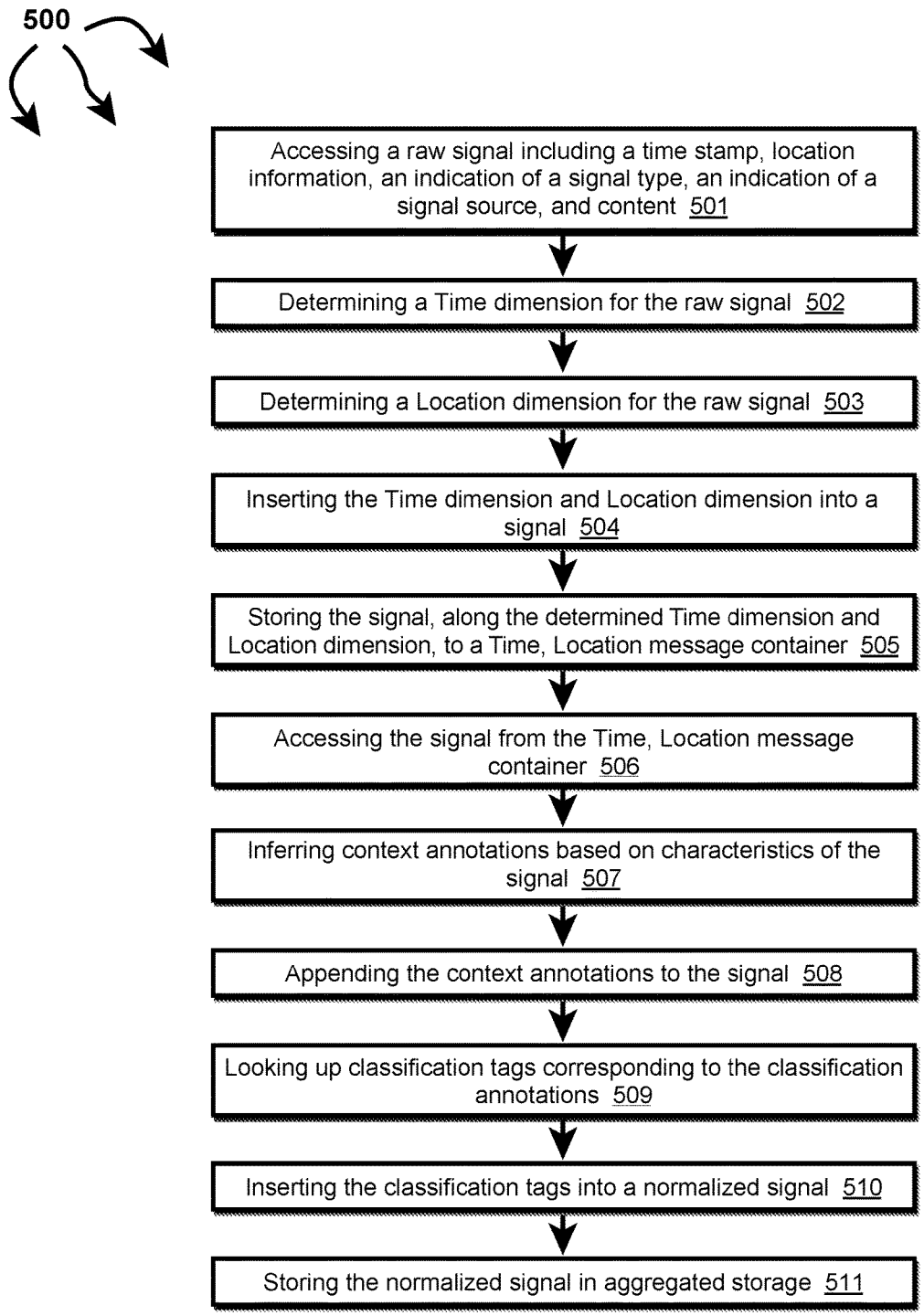
FIG. 5 illustrates a flow chart of an example method for normalizing an ingested signal including time information and location information.

FIG. 5 illustrates a flow chart of an example method 500 for normalizing an ingested signal including time information and location information. Method 500 will be described with respect to the components and data in FIG. 3B.

Method 500 includes accessing a raw signal including a time stamp, location information, an indication of a signal type, an indication of a signal source, and content (501). For example, signal transformer 301B can access raw signal 221B. Raw signal 221B includes timestamp 231B, location information 232B (e.g., lat/lon, GPS coordinates, etc.), signal type 227B (e.g., social media, 911 communication, traffic camera feed, etc.), signal source 228B (e.g., Facebook, twitter, Waze, etc.), and signal content 229B (e.g., one or more of: image, video, audio, text, keyword, locale, etc.).

Method 500 includes determining a Time dimension for the raw signal (502). For example, signal transformer 301B can determine time 223B from timestamp 231B.

Method 500 includes determining a Location dimension for the raw signal (503). For example, signal transformer 301B sends location information 232B to location services 302. Geo cell service 303 can be identify a geo cell corresponding to location information 232B. Market service 304 can identify a designated market area (DMA) corresponding to location information 232B. Location services 302 can include the identified geo cell and/or DMA in location 224B. Location services 302 returns location 224B to signal transformer 301.

Method 500 includes inserting the Time dimension and Location dimension into a signal (504). For example, signal transformer 301B can insert time 223B and location 224B into TL signal 236B. (Although not depicted, timestamp 231B and location information 232B can also be included (or remain) in TL signal 236B). Method 500 includes storing the signal, along with the determined Time dimension and Location dimension, to a Time, Location message container (505). For example, signal transformer 301B can store TL signal 236B to TL signal storage 311. Method 500 includes accessing the signal from the Time, Location message container (506). For example, signal aggregator 308 can access TL signal 236B from TL signal storage 311.

Method 500 includes inferring context annotations based on characteristics of the signal (507). For example, context inference module 312 can access TL signal 236B from TL signal storage 311. Context inference module 312 can infer context annotations 241 from characteristics of TL signal 236B, including one or more of: time 223B, location 224B, type 227B, source 228B, and content 229B. In one aspect, context inference module 312 includes one or more of: NLP modules, audio analysis modules, image analysis modules, video analysis modules, etc. Context inference module 312 can process content 229B in view of time 223B, location 224B, type 227B, source 228B, to infer context annotations 241 (e.g., using machine learning, artificial intelligence, neural networks, machine classifiers, etc.). For example, if content 229B is an image that depicts flames and a fire engine, context inference module 312 can infer that content 229B is related to a fire. Context inference 312 module can return context annotations 241 to signal aggregator 308.

Method 500 includes appending the context annotations to the signal (508). For example, signal aggregator 308 can append context annotations 241 to TL signal 236B. Method 500 includes looking up classification tags corresponding to the classification annotations (509). For example, signal aggregator 308 can send context annotations 241 to classification tag service 306. Classification tag service 306 can identify one or more classification tags 226B (a Context dimension) (e.g., fire, police presence, accident, natural disaster, etc.) from context annotations 241. Classification tag service 306 returns classification tags 226B to signal aggregator 308.

Method 500 includes inserting the classification tags in a normalized signal (510). For example, signal aggregator 308 can insert tags 226B (a Context dimension) into normalized signal 222B (a TLC signal). Method 500 includes storing the normalized signal in aggregated storage (511). For example, signal aggregator 308 can aggregate normalized signal 222B along with other normalized signals determined to relate to the same event. In one aspect, signal aggregator 308 forms a sequence of signals related to the same event. Signal aggregator 308 stores the signal sequence, including normalized signal 222B, in aggregated TLC storage 309 and eventually forwards the signal sequence to event detection infrastructure 103. (Although not depicted, timestamp 231B, location information 232C, and context annotations 241 can also be included (or remain) in normalized signal 222B).

Figure 6:
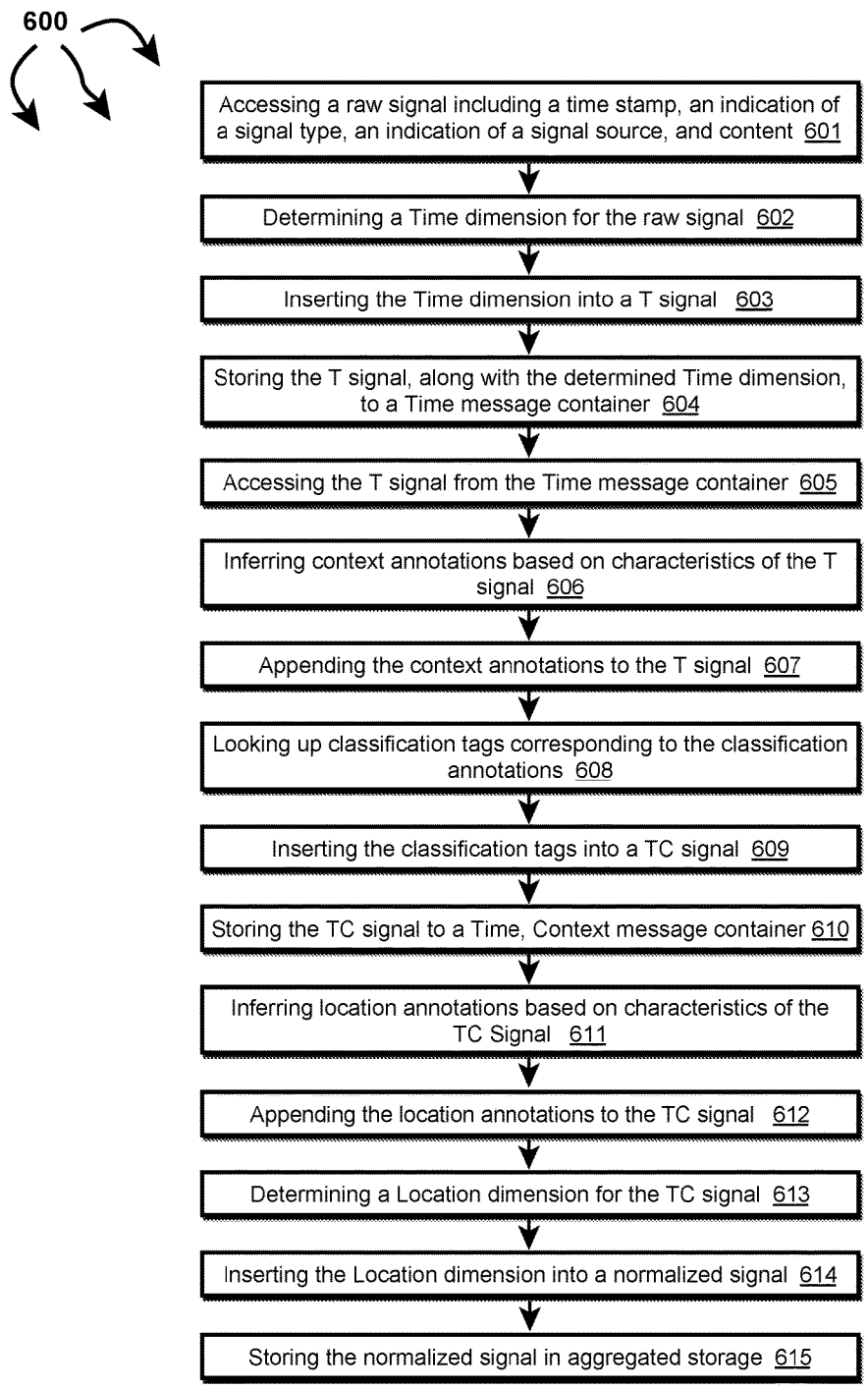
FIG. 6 illustrates a flow chart of an example method for normalizing an ingested signal including time information.

FIG. 6 illustrates a flow chart of an example method 600 for normalizing an ingested signal including time information and location information. Method 600 will be described with respect to the components and data in FIG. 3C.

Method 600 includes accessing a raw signal including a time stamp, an indication of a signal type, an indication of a signal source, and content (601). For example, signal transformer 301C can access raw signal 221C. Raw signal 221C includes timestamp 231C, signal type 227C (e.g., social media, 911 communication, traffic camera feed, etc.), signal source 228C (e.g., Facebook, twitter, Waze, etc.), and signal content 229C (e.g., one or more of: image, video, text, keyword, locale, etc.).

Method 600 includes determining a Time dimension for the raw signal (602). For example, signal transformer 301C can determine time 223C from timestamp 231C. Method 600 includes inserting the Time dimension into a T signal (603). For example, signal transformer 301C can insert time 223C into T signal 234C. (Although not depicted, timestamp 231C can also be included (or remain) in T signal 234C).

Method 600 includes storing the T signal, along with the determined Time dimension, to a Time message container (604). For example, signal transformer 301C can store T signal 236C to T signal storage 313. Method 600 includes accessing the T signal from the Time message container (605). For example, signal aggregator 308 can access T signal 234C from T signal storage 313.

Method 600 includes inferring context annotations based on characteristics of the T signal (606). For example, context inference module 312 can access T signal 234C from T signal storage 313. Context inference module 312 can infer context annotations 242 from characteristics of T signal 234C, including one or more of: time 223C, type 227C, source 228C, and content 229C. As described, context inference module 312 can include one or more of: NLP modules, audio analysis modules, image analysis modules, video analysis modules, etc. Context inference module 312 can process content 229C in view of time 223C, type 227C, source 228C, to infer context annotations 242 (e.g., using machine learning, artificial intelligence, neural networks, machine classifiers, etc.). For example, if content 229C is a video depicting two vehicles colliding on a roadway, context inference module 312 can infer that content 229C is related to an accident. Context inference 312 module can return context annotations 242 to signal aggregator 308.

Method 600 includes appending the context annotations to the T signal (607). For example, signal aggregator 308 can append context annotations 242 to T signal 234C. Method 600 includes looking up classification tags corresponding to the classification annotations (608). For example, signal aggregator 308 can send context annotations 242 to classification tag service 306. Classification tag service 306 can identify one or more classification tags 226C (a Context dimension) (e.g., fire, police presence, accident, natural disaster, etc.) from context annotations 242. Classification tag service 306 returns classification tags 226C to signal aggregator 308.

Method 600 includes inserting the classification tags into a TC signal (609). For example, signal aggregator 308 can insert tags 226C into TC signal 237C. Method 600 includes storing the TC signal to a Time, Context message container (610). For example, signal aggregator 308 can store TC signal 237C in TC signal storage 314. (Although not depicted, timestamp 231C and context annotations 242 can also be included (or remain) in normalized signal 237C).

Method 600 includes inferring location annotations based on characteristics of the TC signal (611). For example, location inference module 316 can access TC signal 237C from TC signal storage 314. Location inference module 316 can include one or more of: NLP modules, audio analysis modules, image analysis modules, video analysis modules, etc. Location inference module 316 can process content 229C in view of time 223C, type 227C, source 228C, and classification tags 226C (and possibly context annotations 242) to infer location annotations 243 (e.g., using machine learning, artificial intelligence, neural networks, machine classifiers, etc.). For example, if content 229C is a video depicting two vehicles colliding on a roadway, the video can include a nearby street sign, business name, etc. Location inference module 316 can infer a location from the street sign, business name, etc. Location inference module 316 can return location annotations 243 to signal aggregator 308.

Method 600 includes appending the location annotations to the TC signal with location annotations (612). For example, signal aggregator 308 can append location annotations 243 to TC signal 237C. Method 600 determining a Location dimension for the TC signal (613). For example, signal aggregator 308 can send location annotations 243 to location services 302. Geo cell service 303 can identify a geo cell corresponding to location annotations 243. Market service 304 can identify a designated market area (DMA) corresponding to location annotations 243. Location services 302 can include the identified geo cell and/or DMA in location 224C. Location services 302 returns location 224C to signal aggregation services 308.

Method 600 includes inserting the Location dimension into a normalized signal (614). For example, signal aggregator 308 can insert location 224C into normalized signal 222C. Method 600 includes storing the normalized signal in aggregated storage (615). For example, signal aggregator 308 can aggregate normalized signal 222C along with other normalized signals determined to relate to the same event. In one aspect, signal aggregator 308 forms a sequence of signals related to the same event. Signal aggregator 308 stores the signal sequence, including normalized signal 222C, in aggregated TLC storage 309 and eventually forwards the signal sequence to event detection infrastructure 103. (Although not depicted, timestamp 231B, context annotations 241, and location annotations 24, can also be included (or remain) in normalized signal 222B).

In another aspect, a Location dimension is determined prior to a Context dimension when a T signal is accessed. A Location dimension (e.g., geo cell and/or DMA) and/or location annotations are used when inferring context annotations.

Accordingly, location services 302 can identify a geo cell and/or DMA for a signal from location information in the signal and/or from inferred location annotations. Similarly, classification tag service 306 can identify classification tags for a signal from context information in the signal and/or from inferred context annotations.

Signal aggregator 308 can concurrently handle a plurality of signals in a plurality of different stages of normalization. For example, signal aggregator 308 can concurrently ingest and/or process a plurality T signals, a plurality of TL signals, a plurality of TC signals, and a plurality of TLC signals. Accordingly, aspects of the invention facilitate acquisition of live, ongoing forms of data into an event detection system with signal aggregator 308 acting as an "air traffic controller" of live data. Signals from multiple sources of data can be aggregated and normalized for a common purpose (e.g., of event detection). Data ingestion, event detection, and event notification can process data through multiple stages of logic with concurrency.

As such, a unified interface can handle incoming signals and content of any kind. The interface can handle live extraction of signals across dimensions of time, location, and context. In some aspects, heuristic processes are used to determine one or more dimensions. Acquired signals can include text and images as well as live-feed binaries, including live media in audio, speech, fast still frames, video streams, etc.

Signal normalization enables the world's live signals to be collected at scale and analyzed for detection and validation of live events happening globally. A data ingestion and event detection pipeline aggregates signals and combines detections of various strengths into truthful events. Thus, normalization increases event detection efficiency facilitating event detection closer to "live time" or at "moment zero".

Event Detection

Figure 1B:
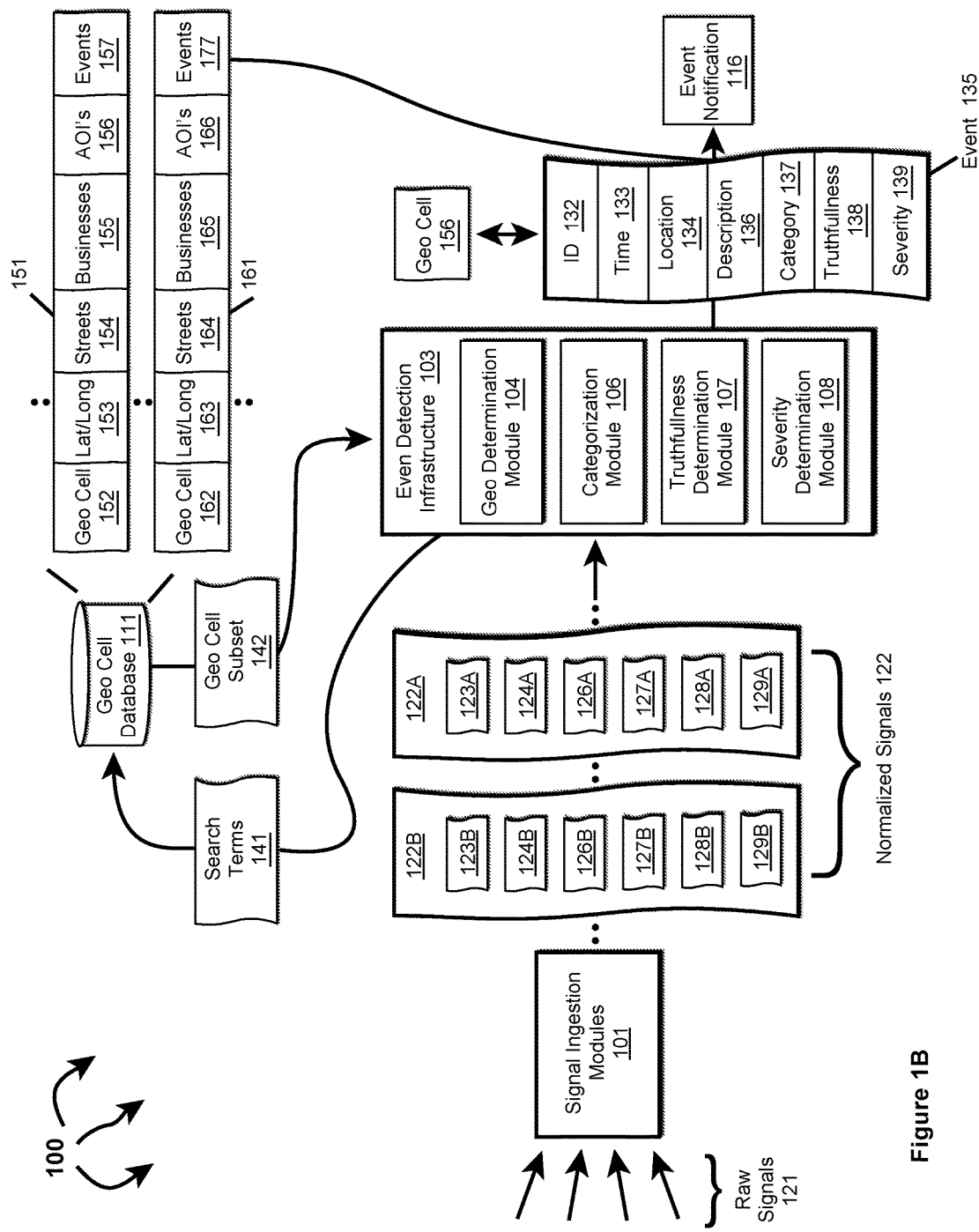
FIG. 1B illustrates an example computer architecture that facilitates detecting events from normalized signals.

Turning back to FIG. 1B, computer architecture 100 also includes components that facilitate detecting events. As depicted, computer architecture 100 includes geo cell database 111 and event notification 116. Geo cell database 111 and event notification 116 can be connected to (or be part of) a network with signal ingestion modules 101 and event detection infrastructure 103. As such, geo cell database 111 and even notification 116 can create and exchange message related data over the network.

As described, in general, on an ongoing basis, concurrently with signal ingestion (and also essentially in real-time), event detection infrastructure 103 detects different categories of (planned and unplanned) events (e.g., fire, police response, mass shooting, traffic accident, natural disaster, storm, active shooter, concerts, protests, etc.) in different locations (e.g., anywhere across a geographic area, such as, the United States, a State, a defined area, an impacted area, an area defined by a geo cell, an address, etc.), at different times from Time, Location, and Context dimensions included in normalized signals. Since, normalized signals are normalized to include Time, Location, and Context dimensions, event detection infrastructure 103 can handle normalized signals in a more uniform manner increasing event detection efficiency and effectiveness.

Event detection infrastructure 103 can also determine an event truthfulness, event severity, and an associated geo cell. In one aspect, a Context dimension in a normalized signal increases the efficiency and effectiveness of determining truthfulness, severity, and an associated geo cell.

Generally, an event truthfulness indicates how likely a detected event is actually an event (vs. a hoax, fake, misinterpreted, etc.). Truthfulness can range from less likely to be true to more likely to be true. In one aspect, truthfulness is represented as a numerical value, such as, for example, from 1 (less truthful) to 10 (more truthful) or as percentage value in a percentage range, such as, for example, from 0% (less truthful) to 100% (more truthful). Other truthfulness representations are also possible. For example, truthfulness can be a dimension or represented by one or more vectors.

Generally, an event severity indicates how severe an event is (e.g., what degree of badness, what degree of damage, etc. is associated with the event). Severity can range from less severe (e.g., a single vehicle accident without injuries) to more severe (e.g., multi vehicle accident with multiple injuries and a possible fatality). As another example, a shooting event can also range from less severe (e.g., one victim without life threatening injuries) to more severe (e.g., multiple injuries and multiple fatalities). In one aspect, severity is represented as a numerical value, such as, for example, from 1 (less severe) to 5 (more severe). Other severity representations are also possible. For example, severity can be a dimension or represented by one or more vectors.

In general, event detection infrastructure 103 can include a geo determination module including modules for processing different kinds of content including location, time, context, text, images, audio, and video into search terms. The geo determination module can query a geo cell database with search terms formulated from normalized signal content. The geo cell database can return any geo cells having matching supplemental information. For example, if a search term includes a street name, a subset of one or more geo cells including the street name in supplemental information can be returned to the event detection infrastructure.

Event detection infrastructure 103 can use the subset of geo cells to determine a geo cell associated with an event location. Events associated with a geo cell can be stored back into an entry for the geo cell in the geo cell database. Thus, over time an historical progression of events within a geo cell can be accumulated.

As such, event detection infrastructure 103 can assign an event ID, an event time, an event location, an event category, an event description, an event truthfulness, and an event severity to each detected event. Detected events can be sent to relevant entities, including to mobile devices, to computer systems, to APIs, to data storage, etc.

Event detection infrastructure 103 detects events from information contained in normalized signals 122. Event detection infrastructure 103 can detect an event from a single normalized signal 122 or from multiple normalized signals 122. In one aspect, event detection infrastructure 103 detects an event based on information contained in one or more normalized signals 122. In another aspect, event detection infrastructure 103 detects a possible event based on information contained in one or more normalized signals 122. Event detection infrastructure 103 then validates the potential event as an event based on information contained in one or more other normalized signals 122.

As depicted, event detection infrastructure 103 includes geo determination module 104, categorization module 106, truthfulness determination module 107, and severity determination module 108.

Generally, geo determination module 104 can include NLP modules, image analysis modules, etc. for identifying location information from a normalized signal. Geo determination module 104 can formulate (e.g., location) search terms 141 by using NLP modules to process audio, using image analysis modules to process images, etc. Search terms can include street addresses, building names, landmark names, location names, school names, image fingerprints, etc. Event detection infrastructure 103 can use a URL or identifier to access cached content when appropriate.

Generally, categorization module 106 can categorize a detected event into one of a plurality of different categories (e.g., fire, police response, mass shooting, traffic accident, natural disaster, storm, active shooter, concerts, protests, etc.) based on the content of normalized signals used to detect and/or otherwise related to an event.

Generally, truthfulness determination module 107 can determine the truthfulness of a detected event based on one or more of: source, type, age, and content of normalized signals used to detect and/or otherwise related to the event. Some signal types may be inherently more reliable than other signal types. For example, video from a live traffic camera feed may be more reliable than text in a social media post. Some signal sources may be inherently more reliable than others. For example, a social media account of a government agency may be more reliable than a social media account of an individual. The reliability of a signal can decay over time.

Generally, severity determination module 108 can determine the severity of a detected event based on or more of: location, content (e.g., dispatch codes, keywords, etc.), and volume of normalized signals used to detect and/or otherwise related to an event. Events at some locations may be inherently more severe than events at other locations. For example, an event at a hospital is potentially more severe than the same event at an abandoned warehouse. Event category can also be considered when determining severity. For example, an event categorized as a "Shooting" may be inherently more severe than an event categorized as "Police Presence" since a shooting implies that someone has been injured.

Geo cell database 111 includes a plurality of geo cell entries. Each geo cell entry is included in a geo cell defining an area and corresponding supplemental information about things included in the defined area. The corresponding supplemental information can include latitude/longitude, street names in the area defined by and/or beyond the geo cell, businesses in the area defined by the geo cell, other Areas of Interest (AOIs) (e.g., event venues, such as, arenas, stadiums, theaters, concert halls, etc.) in the area defined by the geo cell, image fingerprints derived from images captured in the area defined by the geo cell, and prior events that have occurred in the area defined by the geo cell. For example, geo cell entry 151 includes geo cell 152, lat/lon 153, streets 154, businesses 155, AOIs 156, and prior events 157. Each event in prior events 157 can include a location (e.g., a street address), a time (event occurrence time), an event category, an event truthfulness, an event severity, and an event description. Similarly, geo cell entry 161 includes geo cell 162, lat/lon 163, streets 164, businesses 165, AOIs 166, and prior events 167. Each event in prior events 167 can include a location (e.g., a street address), a time (event occurrence time), an event category, an event truthfulness, an event severity, and an event description.

Other geo cell entries can include the same or different (more or less) supplemental information, for example, depending on infrastructure density in an area. For example, a geo cell entry for an urban area can contain more diverse supplemental information than a geo cell entry for an agricultural area (e.g., in an empty field).

Geo cell database 111 can store geo cell entries in a hierarchical arrangement based on geo cell precision. As such, geo cell information of more precise geo cells is included in the geo cell information for any less precise geo cells that include the more precise geo cell.

Geo determination module 104 can query geo cell database 111 with search terms 141. Geo cell database 111 can identify any geo cells having supplemental information that matches search terms 141. For example, if search terms 141 include a street address and a business name, geo cell database 111 can identify geo cells having the street name and business name in the area defined by the geo cell. Geo cell database 111 can return any identified geo cells to geo determination module 104 in geo cell subset 142.

Geo determination module can use geo cell subset 142 to determine the location of event 135 and/or a geo cell associated with event 135. As depicted, event 135 includes event ID 132, time 133, location 137, description 136, category 137, truthfulness 138, and severity 139.

Event detection infrastructure 103 can also determine that event 135 occurred in an area defined by geo cell 162 (e.g., a geohash having precision of level 7 or level 9). For example, event detection infrastructure 103 can determine that location 134 is in the area defined by geo cell 162. As such, event detection infrastructure 103 can store event 135 in events 167 (i.e., historical events that have occurred in the area defined by geo cell 162).

Event detection infrastructure 103 can also send event 135 to event notification module 116. Event notification module 116 can notify one or more entities about event 135. When appropriate and as described, event notification 116 can also use information consolidation and deduplication techniques to conserve computer system and/or network resources.

Multi-Signal Event Detection

Figure 7:
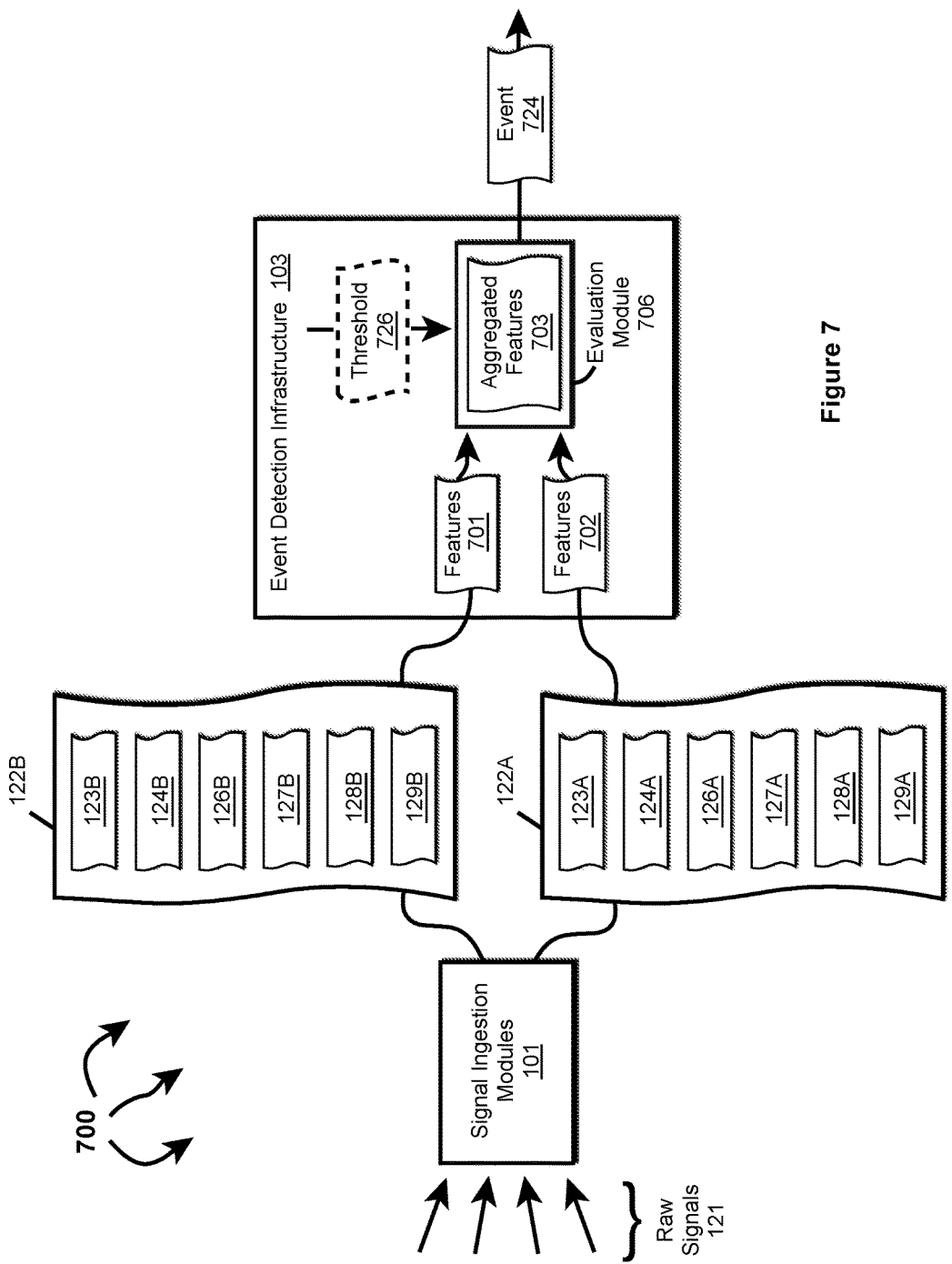
FIG. 7 illustrates an example computer architecture that facilitates detecting an event from features derived from multiple signals.

FIG. 7 illustrates an example computer architecture 700 that facilitates detecting an event from features derived from multiple signals. As depicted, in computer architecture 700 event detection infrastructure 103 includes evaluation module 706. Evaluation module 706 is configured to determine if features of a plurality of normalized signals collectively indicate an event. In general, evaluation module 706 can detect (or not detect) an event based on one or more features of one normalized signal in combination with one or more features of another normalized signal.

Figure 8:
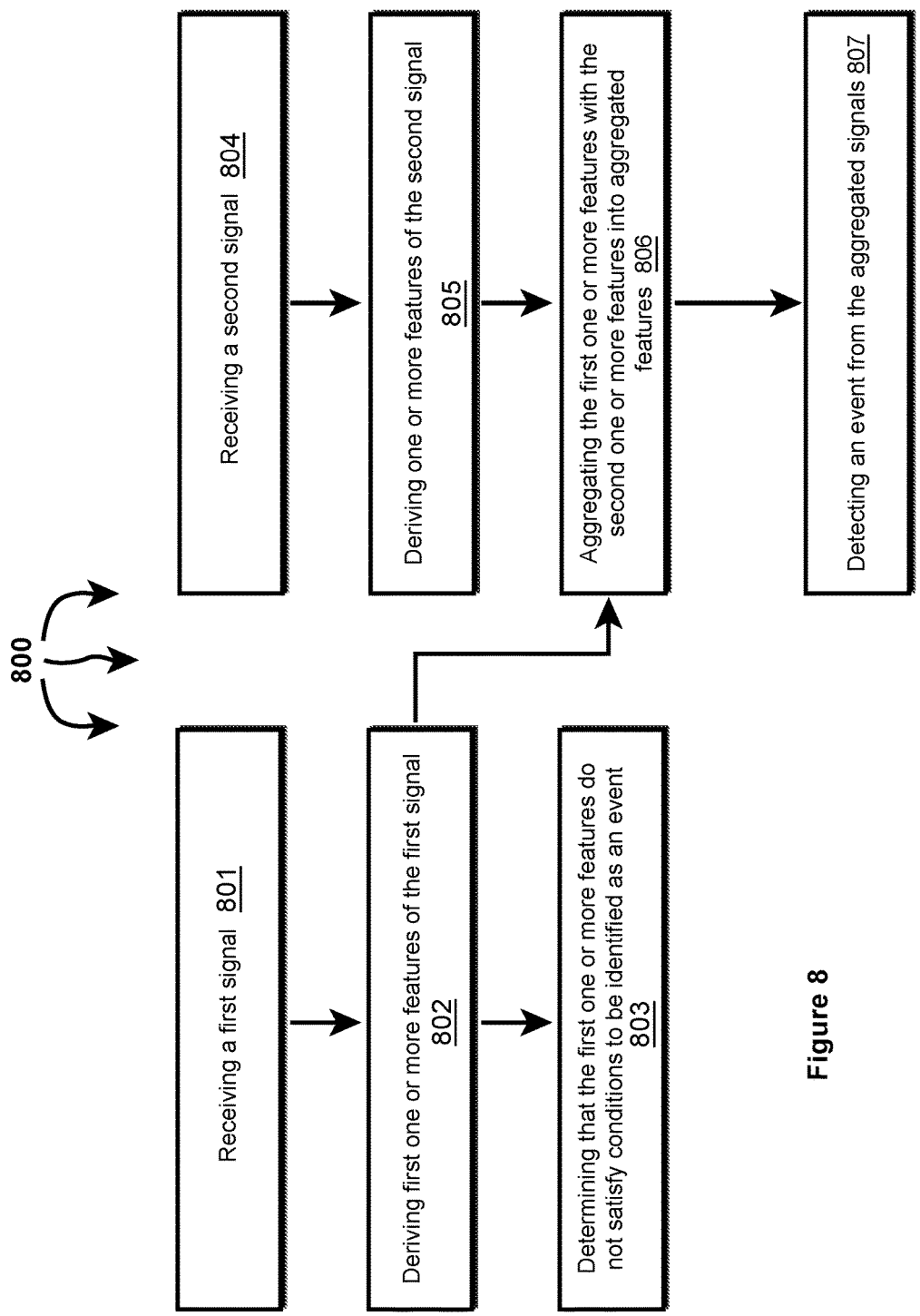
FIG. 8 illustrates a flow chart of an example method for detecting an event from features derived from multiple signals.

FIG. 8 illustrates a flow chart of an example method 800 for detecting an event from features derived from multiple signals. Method 800 will be described with respect to the components and data in computer architecture 700.

Method 300 includes receiving a first signal (801). For example, event detection infrastructure 103 can receive normalized signal 122B. Method 800 includes deriving first one or more features of the first signal (802). For example, event detection infrastructure 103 can derive features 701 of normalized signal 122B. Features 701 can include and/or be derived from time 123B, location 124B, context 126B, content 127B, type 128B, and source 129B. Event detection infrastructure 103 can also derive features 701 from one or more single source probabilities assigned to normalized signal 122B.

Method 800 includes determining that the first one or more features do not satisfy conditions to be identified as an event (803). For example, evaluation module 206 can determine that features 701 do not satisfy conditions to be identified as an event. That is, the one or more features of normalized signal 122B do not alone provide sufficient evidence of an event. In one aspect, one or more single source probabilities assigned to normalized signal 122B do not satisfy probability thresholds in thresholds 726.

Method 800 includes receiving a second signal (804). For example, event detection infrastructure 103 can receive normalized signal 122A. Method 800 includes deriving second one or more features of the second signal (805). For example, event detection infrastructure 103 can derive features 702 of normalized signal 122A. Features 702 can include and/or be derived from time 123A, location 124A, context 126A, content 127A, type 128A, and source 129A. Event detection infrastructure 103 can also derive features 702 from one or more single source probabilities assigned to normalized signal 122A.

Method 800 includes aggregating the first one or more features with the second one or more features into aggregated features (806). For example, evaluation module 706 can aggregate features 701 with features 702 into aggregated features 703. Evaluation module 706 can include an algorithm that defines and aggregates individual contributions of different signal features (from different normalized signals) into aggregated features. Aggregating features 701 and 702 into aggregated features 703 can include aggregating a single source probability assigned to normalized signal 122B for an event type with a signal source probability assigned to normalized signal 122A for the event type into a multisource probability for the event type.

Method 800 includes detecting an event from the aggregated features (807). For example, evaluation module 706 can determine that aggregated features 703 satisfy conditions to be detected as an event. Evaluation module 706 can detect event 724, such as, for example, a fire, an accident, a shooting, a protest, etc. based on satisfaction of the conditions.

In one aspect, conditions for event identification can be included in thresholds 726. Conditions can include threshold probabilities per event type. When a probability exceeds a threshold probability, evaluation module 706 can detect an event. A probability can be a single signal probability or a multisource (aggregated) probability. As such, evaluation module 706 can detect an event based on a multisource probability exceeding a probability threshold in thresholds 726.

Figure 9:
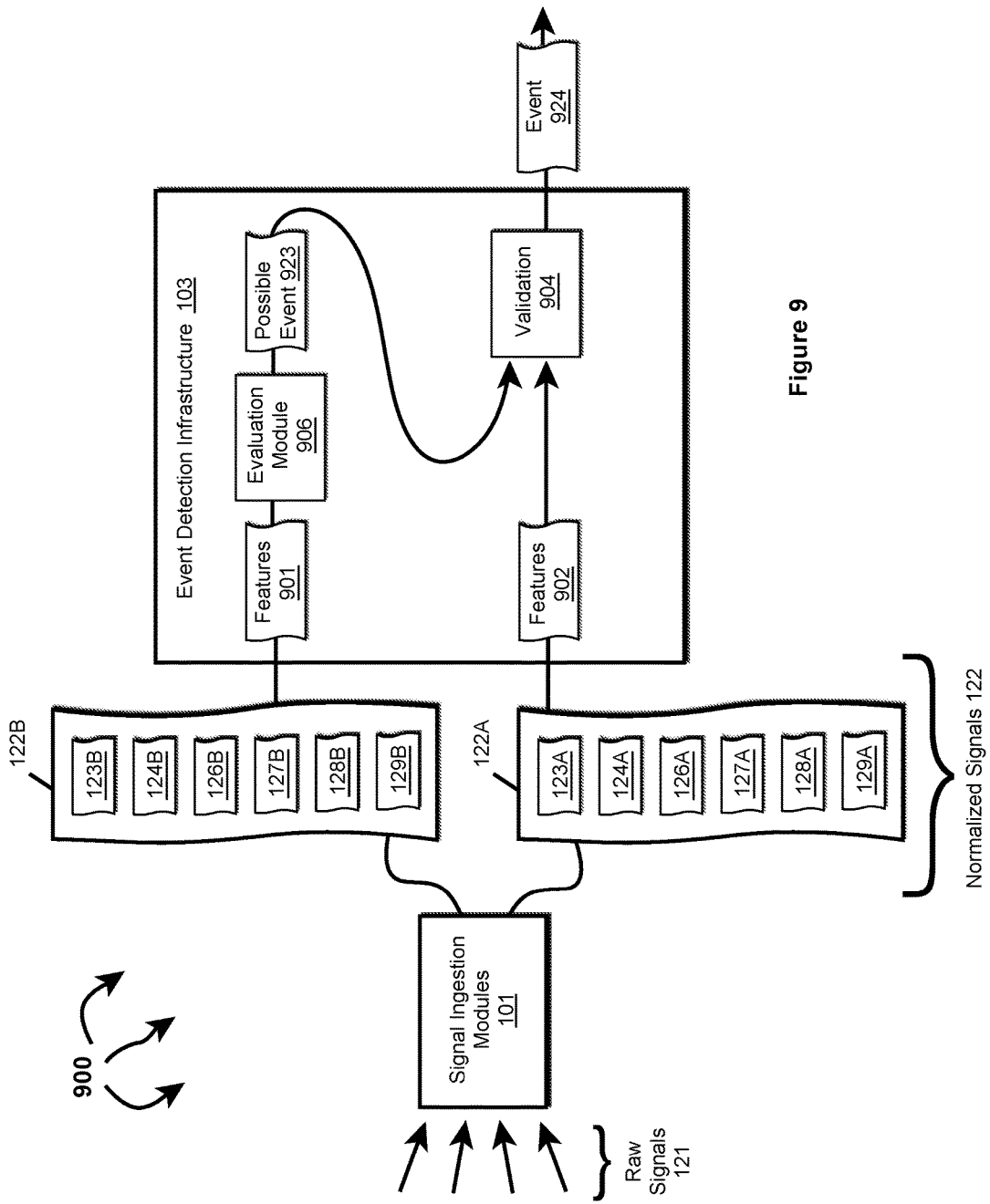
FIG. 9 illustrates an example computer architecture that facilitates detecting an event from features derived from multiple signals.
Figure 10:
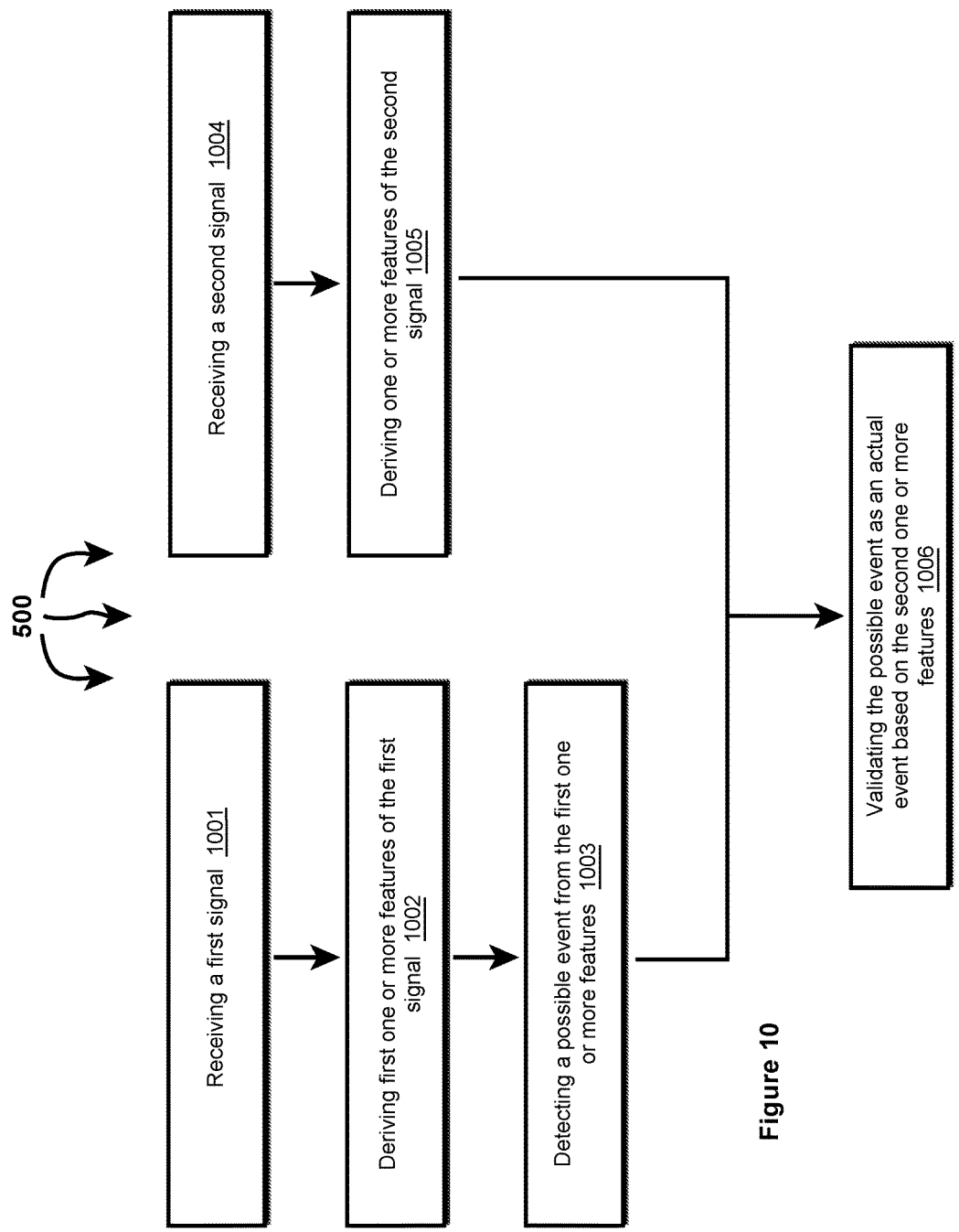
FIG. 10 illustrates a flow chart of an example method for detecting an event from features derived from multiple signals

FIG. 9 illustrates an example computer architecture 900 that facilitates detecting an event from features derived from multiple signals. As depicted, in computer architecture 900 event detection infrastructure 103 includes evaluation module 906 and validator 904. Evaluation module 906 is configured to determine if features of a one or more normalized signals indicate a possible event. Evaluation module 906 can detect (or not detect) a possible event based at least on one feature of one normalized signal. Evaluation module 906 can also consider one or more features of multiple different normalized signals when attempting to detect a possible event.

Validator 904 is configured to determine if a possible event is validated as an actual event. Validator 904 can validate (or not validate) a possible event as an actual event based on at least one feature of a further normalized signal. Validator 904 can also consider one or more features of multiple different further normalized signals when attempting to validate an actual event.

FIG. 1000 illustrates a flow chart of an example method 1000 for detecting an event from features derived from multiple signals. Method 1000 will be described with respect to the components and data in computer architecture 900.

Method 1000 includes receiving a first signal (1001). For example, event detection infrastructure 103 can receive normalized signal 122B. Method 1000 includes deriving first one or more features of the first signal (1002). For example, event detection infrastructure 103 can derive features 901 of normalized signal 122B. Features 901 can include and/or be derived from time 123B, location 124B, context 126B, content 127B, type 128B, and source 129B. Event detection infrastructure 103 can also derive features 901 from one or more single source probabilities assigned to normalized signal 122B.

Method 500 includes detecting a possible event from the first one or more features (1003). For example, evaluation module 906 can detect possible event 923 from features 901. Based on features 901, evaluation module 906 can determine that evidence included in features 901 is not confirming of an event but is sufficient to warrant further investigation of an event type. In one aspect, a single source probability assigned to normalized signal 122B for an event type does not satisfy a probability threshold for full event detection but does satisfy a probability threshold for further investigation.

Method 1000 includes receiving a second signal (1004). For example, event detection infrastructure 103 can receive normalized signal 122A. Method 1000 includes deriving second one or more features of the second signal (1005). For example, event detection infrastructure 103 can derive features 902 of normalized signal 122A. Features 902 can include and/or be derived from time 123A, location 124A, context 126A, content 127A, type 128A, and source 129A. Event detection infrastructure 103 can also derive features 902 from one or more single source probabilities assigned to normalized signal 122A.

Method 1000 includes validating the possible event as an actual event based on the second one or more features (1006). For example, validator 904 can determine that possible event 923 in combination with features 902 provides sufficient evidence of an actual event. As such, validator 204 can validate possible event 923 as event 924 based on features 902. In one aspect, validator 904 considers a single source probability assigned to normalized signal 122A in view of a single source probability assigned to normalized signal 122B. Validator 204 determines that the signal source probabilities, when considered collectively, satisfy a probability threshold for detecting an event.

Consolidating Information from Different Signals into an Event

In some aspects, multiple pieces of content in a normalized signal, for example, text, images, audio, video, etc., may independently indicate an event. However, it may take different amounts of time to process different types of content. For example, it may be quicker to process text than to process video or audio. As such, content from a single normalized signal may cause multiple detections of the same event at different times.

For example, a social post may include text stating that "there is a car on fire at the Kroger on Parleys Way" and may also include an image of a burning car with the Kroger logo visible on building in the background. Through natural language processing, event detection infrastructure 103 can relatively quick detect a "fire" event from the text. Through image analysis, event detection infrastructure 103 can also detect the "fire" event from the image. However, the image analysis process can take longer than the natural language process.

In other aspects, a number of different normalized signals ingested at different times and/or processing in different order are indicative of the same event. For example, multiple people can take a picture of an accident as they pass it on the highway. As such, content from multiple normalized signals may also cause multiple detections of the same event at different times.

Accordingly, aspects of the invention used a multiphase approach to consolidating information from different signals into (e.g., deduplicating) identified events. An event infrastructure maintains an event holding cache. Detected events are held in the event holding cache for some amount of time after detection in accordance with configurable event holding criteria. Event holding criteria can be based on, for example, a specified time interval, current processing times, available processing resources, etc. As events are detected, a duplicate detector compares currently detected events to previously cached events. Events determined to be the same event are grouped into an event group. Many events can be accumulated into an event group. When holding criteria expire for an event in the event group, the event group is published to one or more entities (i.e., the one or more entities are notified of the event). As such, each new detection of the event does not trigger a corresponding new notification.

Figure 11:
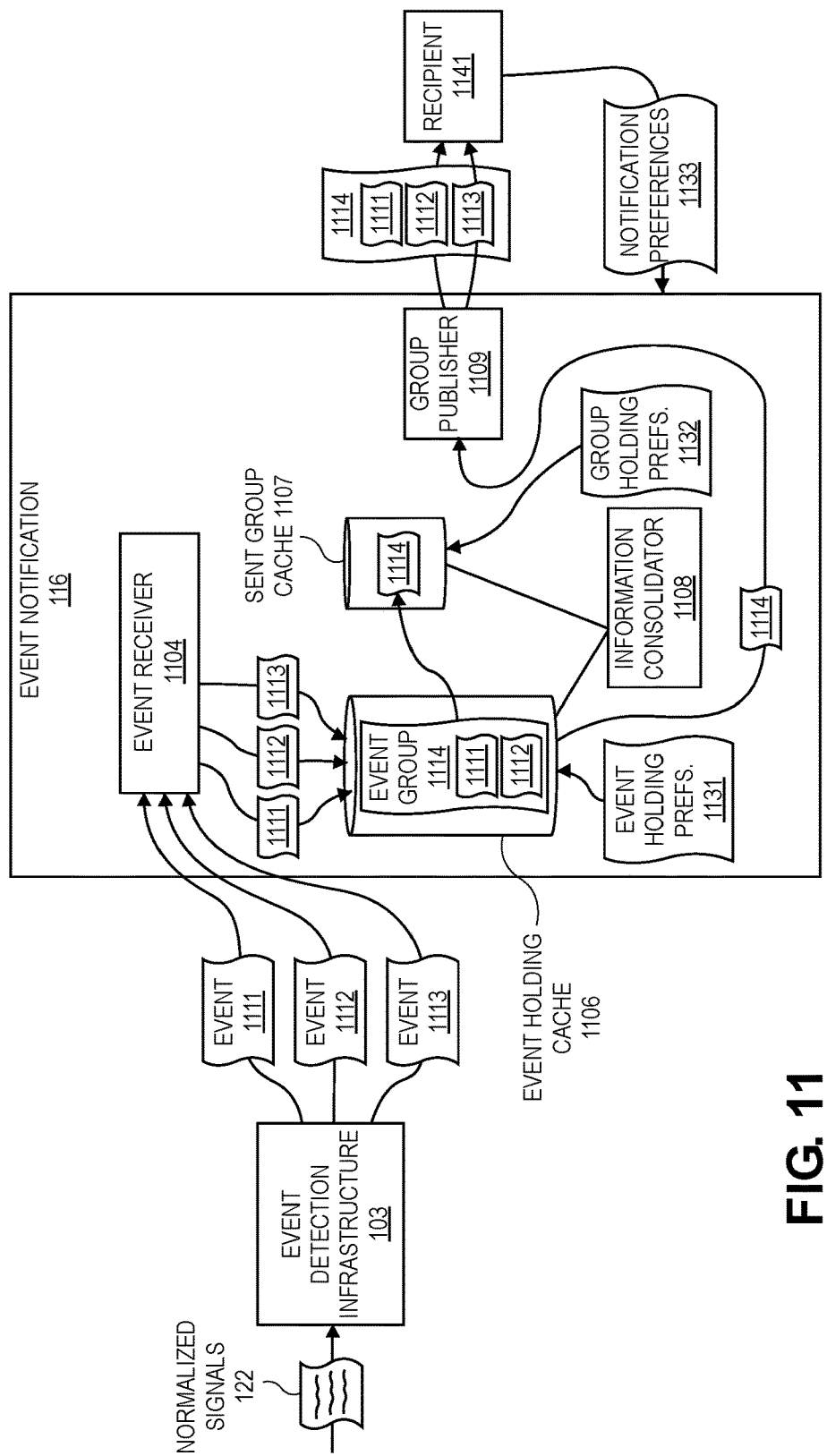
FIG. 11 illustrates an example computer architecture that facilitates consolidating information from different signals into events.

FIG. 11 illustrates an example computer architecture that facilitates consolidating information from different signals into events. As depicted in FIG. 11, event notification 116 further includes event receiver 1104, event holding cache 1106, sent group cache 1107, information consolidator 1108 (e.g., a duplicate detector), and group publisher 1109. In general, event receiver 1104 is configured to receive events from event detection infrastructure 103. As event receiver 1104 receives events, event receiver 1104 can cache the events in event holding cache 1106. Events can remain in event holding cache 1106 in accordance with event holding preferences 1131. In one aspect, event holding preferences 1131 define a configurable appropriate event holding period (e.g., between 1 and 20 seconds) events are to remain in event holding cache 1106.

Event holding preferences 1131 can be selected by an administrator or a user or can be based on user input. An event holding period may be configured based on event holding preferences 1131 in view of processing times or loads at components of event infrastructure 103, in view of processing resources (e.g., memory, GPUs, etc.) available to event infrastructure 103, etc. In one aspect, a monitoring module (not shown) monitors operational performance and/or resource availability at components of computer architecture 100. Event notification 116 can dynamically change/adjust an event holding period to adapt to performance changes and/or resource availability changes while attempting to satisfy event holding preferences 1131 to the extent possible. Thus, due to performance and/or resource availability constraints event notification 116 can override (e.g., reduce) a configured event holding period.

In general, information consolidator 1108 is configured to detect duplicate events. In one aspect, information consolidator 1108 compares newly detected events to previously cached events in event holding cache 1106. When information consolidator 1108 detects that a newly received event and a previously cached event are the same event, information consolidator 1108 groups the newly received event and the previously cached event into the same event group. Information consolidator 1108 can group events into an event group until a holding period for an event in the event group expires.

Group publisher 1109 is configured to publish event groups and event group updates to recipients. In one aspect, when a holding period for an event expires, group publisher 109 sends a corresponding event group to one or more recipients. When an event group is published, event notification 116 can also move the event group from event holding cache 1106 to sent group cache 1107.

Event groups can remain in sent group cache 1107 in accordance with group holding preferences 1132. In one aspect, group holding preferences 1132 defines a preferred group holding period event groups are to remain in sent group cache 1107 (e.g., between 1 and 2 minutes). Group holding preferences 1132 can be selected by an administrator or a user or can be based on user input.

A group holding period, may be configured based on group holding preferences in view of processing times, event group creation times, or loads at components of event infrastructure 103, in view of processing resources (e.g., memory, GPUs, etc.) available to event infrastructure 103, etc. In one aspect, the monitoring module (not shown) monitors event group creation, operational performance and/or resource availability at components of computer architecture 100. Event notification 116 can dynamically change/adjust a group holding period to adapt to performance changes and/or resource availability changes while attempting to satisfy group holding preferences 1132 to the extent possible. Thus, due to performance and/or resource availability constraints event notification 116 can override (e.g., reduce) a configured group holding period.

Information consolidator 1108 can compare newly detected events to cached event groups to determine if a newly detected event belongs to a cached event group. In one aspect, duplicate detector determines that a detected event is a (re)detection of prior event and belongs to a cached event group. When an event belongs to a cached event group, group publisher 1109 can publish the event as a supplement and/or update to prior publication of the event group. Supplementing a previously published event group can reduce resource impact and limit user experience degradation relative to sending a "new" event notification. For example, a user interface screen may increment to show a new detection of the same event, which is less impactful (and resource intensive) than presenting a pop-up window or other user interface components to draw attention to a "new" event.

In general, recipients can formulate notification preferences indicating how they prefer to be notified of events. Recipients can send notification preferences to event notification 116. Event notification can notify recipients in accordance with their notification preferences.

For example, recipient 1141 can formulate notification preferences 1133 indicating how they preferred to be notified of events. Recipient 1141 can send notification preferences 1133 to event notification 116. Event notification 116 can notify recipient 1141 of detected events in accordance with notification preferences 1133. Notification preferences 1133 can define preferences for being notified of newly detected event groups as well as preferences for being notified of event updates (e.g., redetections of an event). Recipient 1141 may desire to be notified of newly detected event groups differently than event updates. For example, recipient 1141 may desire notification of new event groups as soon as possible (e.g., upon detection). On the other hand, recipient 1141 may desire notification of event updates at specified time intervals (e.g., once a minute). Recipient 1141 may even prefer to ignore event updates.

In one aspect, information consolidator 1108 compares a newly detected event to cached event groups in sent group cache 1107 prior to comparing the newly detected event to previously cached events in event holding cache 1106.

An event can be removed from event holding cache 1106 when the event is published to a recipient entity. When an event is grouped into an event group, the event may be removed from event holding cache prior to a holding period expiring. For example, a newly detected event can be included in an event group with a previously cached event. The event group may be published when a holding period for the previously cached event expires. Thus, publishing the event group causes the newly detected event to be sent before its holding period expires.

It some aspects, one or more of event holding cache, sent group cache, information consolidator, event holding preferences, and group holding preferences are implemented at event detection infrastructure 103. Thus, some information consolidation and/or deduplication can occur at event detection infrastructure 103 and other information consolidation and/or deduplication can occur at event notification 116. Accordingly, event detection infrastructure 103 and event notification 116 can interoperate to implement the principles of the present invention.

Figure 12:
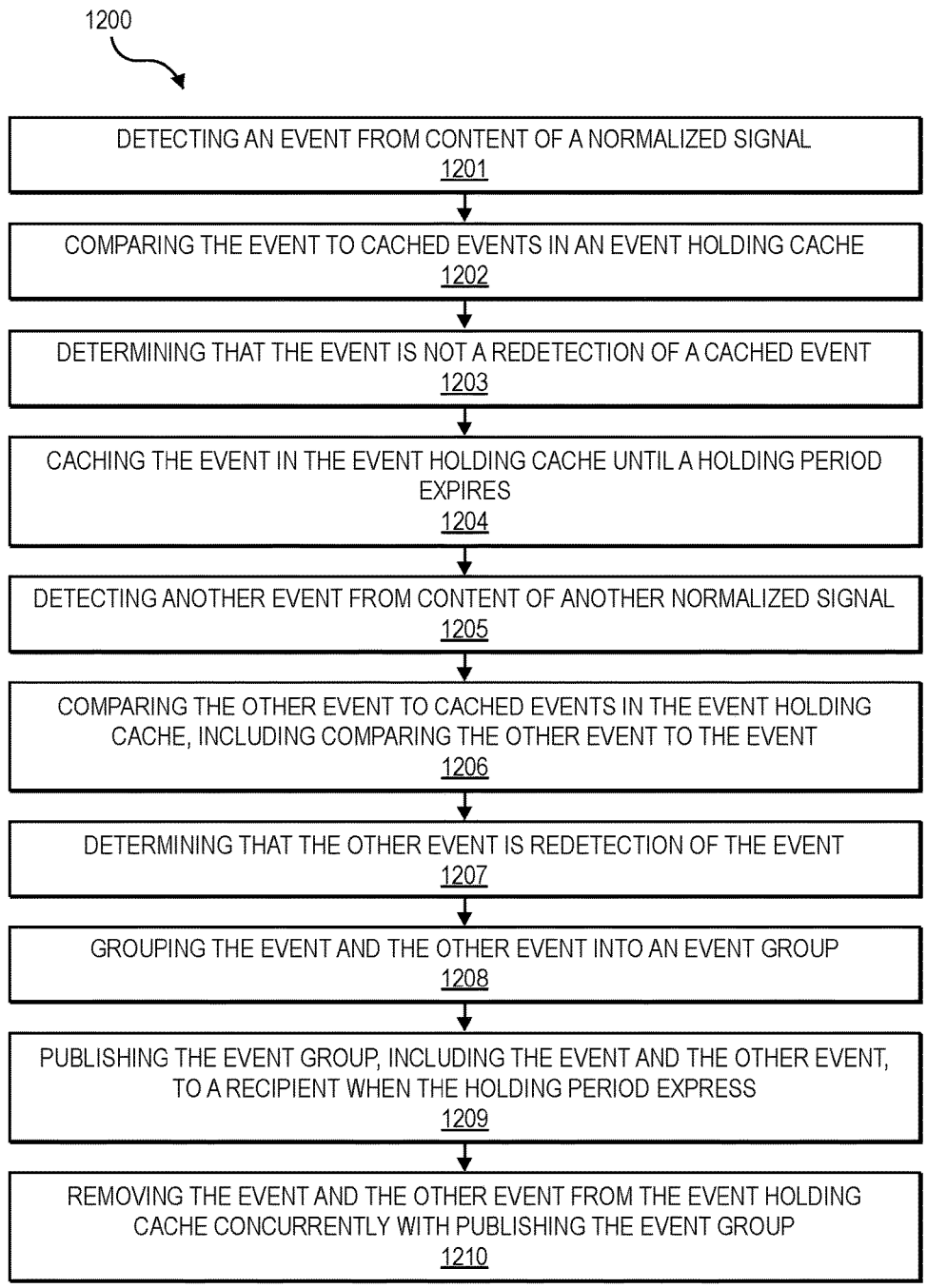
FIG. 12 illustrates a flow chart of an example method for consolidating information from different signals into events.

FIG. 12 illustrates a flow chart of an example method 1200 for consolidating information from different signals into events. Method 1200 will be described with respect to the components and data in FIG. 11.

Method 1200 includes detecting an event from content of a normalized signal (1201). For example, event detection infrastructure 103 can detect event 1111 from the content of one or more normalized signals in normalized signals 122. Event detection infrastructure can send event 1111 to event notification 116. Event receiver 1104 can receive event 1111 from event detection infrastructure 103.

Method 1200 includes comparing the event to cached events in an event holding cache (1202). For example, information consolidator 1108 can compare event 1111 to events cached in event holding cache 1106. Method 1200 includes determining that the event is not a redetection of a cached event (1203). For example, information consolidator 1108 can determine that event 1111 is not a redetection of an event (e.g., previously detected) and cached in event holding cache 1106. Method 1200 includes caching the event in the event holding cache until a holding period expires (1204). For example, event receiver 1104 can cache event 1111 in event holding cache 1106.

Method 1200 includes detecting another event from content of another normalized signal (1205). For example, event detection infrastructure 103 can detect event 1112 from the content of one or more normalized signals in normalized signals 122. Event detection infrastructure can send event 1112 to event notification 116. Event receiver 1104 can receive event 1112 from event detection infrastructure 103.

Method 1200 includes comparing the other event to cached events in the event holding cache, including comparing the other event to the event (1206). For example, information consolidator 1108 can compare event 1112 to events cached in event holding cache 1106, including comparing event 1112 to event 1111. Method 1200 includes determining that the other event is redetection of the event (1207). For example, information consolidator 1108 can determine that event 1111 is a redetection of event 1112.

When event 1112 is determined to not be a duplicate of event 1111, event 1112 can be cached in event holding cache 1114 in a different existing event group. Alternately, a new event group can be formed and event 1112 cached in the new event group.

Method 1200 includes grouping the event and the other event into an event group (1208). For example, event notification 116 can group event 1111 and event 1112 in event group 1114. Method 1200 includes publishing the event group, including the event and the other event, to a recipient when the holding period expires (1209). For example, group publisher 1009 can access event group 1114 from event holding cache and publish event group 1114 to recipient 1141.

Method 1200 includes removing the event and the other event from the event holding cache concurrently with publishing the event group (1210). For example, event notification 116 can remove event group 1114 from event holding cache 1106 concurrently with group publisher 1109 publishing group 1114 to recipient 1141. In one aspect, event notification 116 moves event group 1114 from event holding cache 1106 to sent group cache 1107.

In one aspect, information consolidator 1108 checks sent group cache 1107 for event redetections (duplicates) prior to checking event holding cache 1106 for event redetections (duplicates). If a newly detected event is determined to be a redetection of an event in sent group cache 1107, the newly detected event can be used as an update to the event group.

Figure 13:
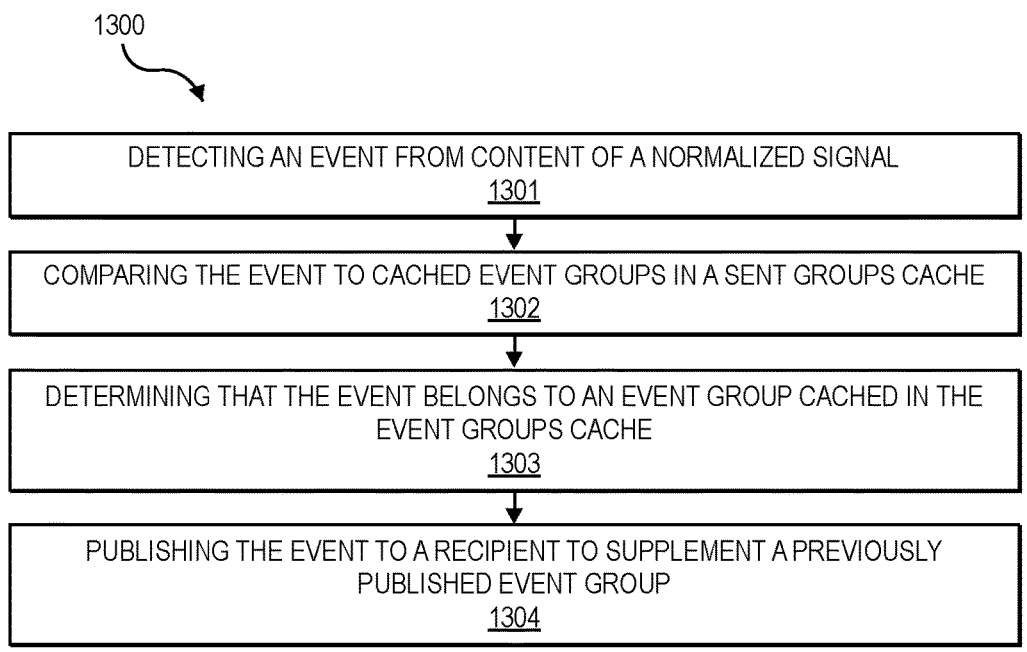
FIG. 13 illustrates a flow chart of an example method for consolidating information from different signals into events.

FIG. 13 illustrates a flow chart of an example method 1300 for consolidating information from different signals into events. Method 1300 will be described with respect to the components and data in FIG. 11.

Method 1300 includes detecting an event from content of a normalized signal (1301). For example, event detection infrastructure 103 can detect event 1113 from the content of one or more normalized signals in normalized signals 122. Event detection infrastructure can send event 1113 to event notification 116. Event receiver 1104 can receive event 1113 from event detection infrastructure 103.

Method 1300 includes comparing the event to cached event groups in a sent groups cache (1302). For example, information consolidator 1108 can compare event 1113 to events in event groups cached at sent group cache 1107, including event group 1114. Method 1300 determining that the event belongs to an event group cached in the event groups cache (1303). For example, information consolidator 1108 can determine that event 1113 is a duplicate of event 1111, a duplicate of event 1112, or otherwise belongs to event group 1114.

Method 1300 includes publishing the event to a recipient to supplement a previously published event group (1304). For example, group publisher 1109 can publish event 1113 (another detection of the same event) to recipient 1141 as a supplement (e.g., update) to publication of event group 1114 (and not as a new event). Accordingly, resource consumption is minimized and user experience improved since a new (and redundant) event notification is not generated and published to recipient 1141. Resource consumption is further minimized when recipient 1141 prefers to ignore event updates (e.g., as indicated in notification preferences 1133).

Multi-Stage Event Information Consolidation

It may also be that different types of content are processed in different event detection pipelines. For example, text can be processed in one pipeline and images can be processed in another pipeline. Each pipeline may be independently capable of detecting events. One or more signals can include multiple different types of content. Even a single signal can include multiple different types of content. For example, a social media post can include text content and image content. Thus, models in different pipelines can detect the same event (possibly based on signal content in the same signal).

As described, sending multiple notifications of the same event to recipient entities (whether detected in succession or concurrently) is an inefficient use of resources and also degrades recipient user experience. Accordingly, aspects of the invention used a multiphase approach to information consolidation and/or event deduplication.

In one aspect, a plurality of different types of content are provided as input to a corresponding a plurality of different pipelines. For example, text content is provided to a pipeline including NLP models, image content is provided to a pipeline including image analysis models, audio is provided to a pipeline including audio analysis models, etc. Output from the plurality of different detection pipelines is aggregated prior to event detection. An event detection infrastructure considers the aggregated output when determining if an event is detected (e.g., a unified detection).

A unique identifier can be assigned to a signal. The unique identifier can be sent along with different types of signal content sent to corresponding different processing pipelines. For example, the unique identifier can be sent along with text content to a text processing pipeline. The unique identifier is output along with NLP model output from the text processing pipeline. Similarly, the unique identifier can be sent along with image content an image processing pipeline. The unique identifier is output along with image analysis model output from the image processing pipeline.

The event detection infrastructure 103 can determine that the NLP model output and the image analysis model output correspond to the same signal based on the unique identifier. Based on inclusion in the same signal, the event detection infrastructure aggregates the NLP model output and the image analysis model output into aggregated output. The event detection infrastructure considers the aggregated output for event detection. Thus, a single event is potentially detected.

Models for different types of content may take different amounts of time to process content. Model outputs from more efficiently executing models can be cached for a specified period of time, allowing time for less efficiently executing models to generate model output. The length of the specified period of time can be configured to strike a balance between reducing duplicate event detections from different types of content and notifying entities of events in a timely manner.

Events detected from different types of content (whether in the same signal or different signals) can be sent to event notification 116. Event notification 116 can implement described information consolidation (e.g., deduplication) techniques.

It some aspects, one or more of event holding cache, sent group cache, information consolidator, event holding preferences, and group holding preferences are implemented at event detection infrastructure 103. Thus, some information consolidation and/or deduplication can occur at event detection infrastructure 103 and other information consolidation and/or deduplication can occur at event notification 116. Accordingly, event detection infrastructure 103 and event notification 116 can interoperate to implement the principles of the present invention.

Figure 14:
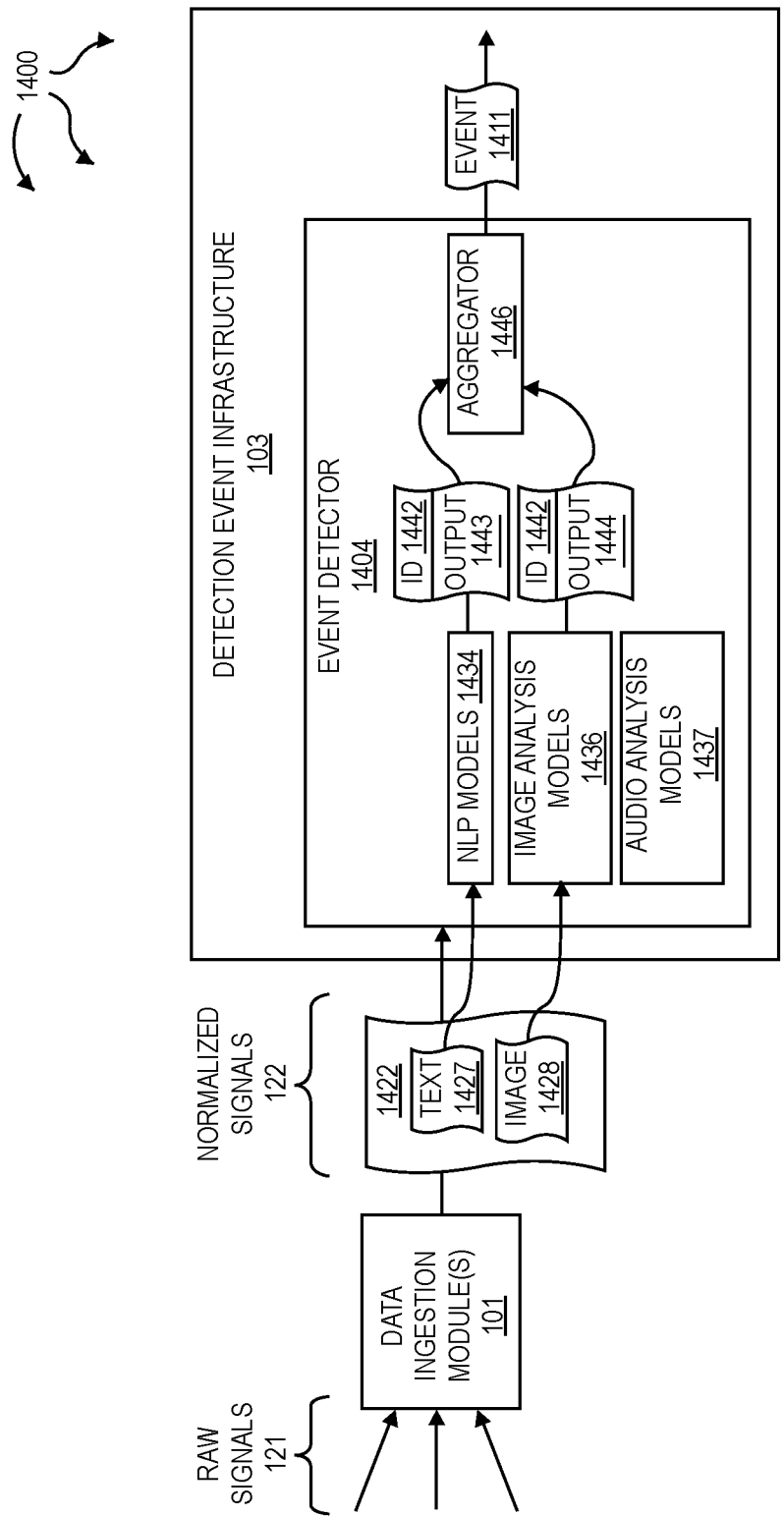
FIG. 14 illustrates an example computer architecture that facilitates consolidating information from different signals into events.

FIG. 14 illustrates an example computer architecture that facilitates consolidating information from different signals into events. As depicted in FIG. 14, event infrastructure 103 includes event detector 1404 (which can be integrated with and/or interoperate with event one or more of event holding cache 1106, sent group cache 1107, information consolidator 1108, and group publisher 1109.

Event detector 1404 further includes NLP models 1434, image analysis modules 1436, audio analysis models 1437, etc. The various models can be trained through machine learning. The various models can provide artificial intelligence (e.g., implemented in neural networks) classifying and/or scoring content as possibly indicative of an event.

On an ongoing basis (and also essentially in real-time), event detector 1404 receives content in normalized signals 122. Event detector 1404 can detect events from information contained in and/or associated with normalized signals 122. The content can indicate that an event is occurring. For example, a social post may include text stating that "there is a car on fire at the Nordstrom on main street" and may include an image of a burning car with the Nordstrom logo visible on building in the background. Through natural language processing and/or image analysis, event detector 1404 can detect a "fire" event.

Upon receiving a signal, event detector 1404 can associate a unique identifier with the signal. The unique identifier can travel along with content going through different pipelines and can be associated with output from those pipelines.

Figure 15:
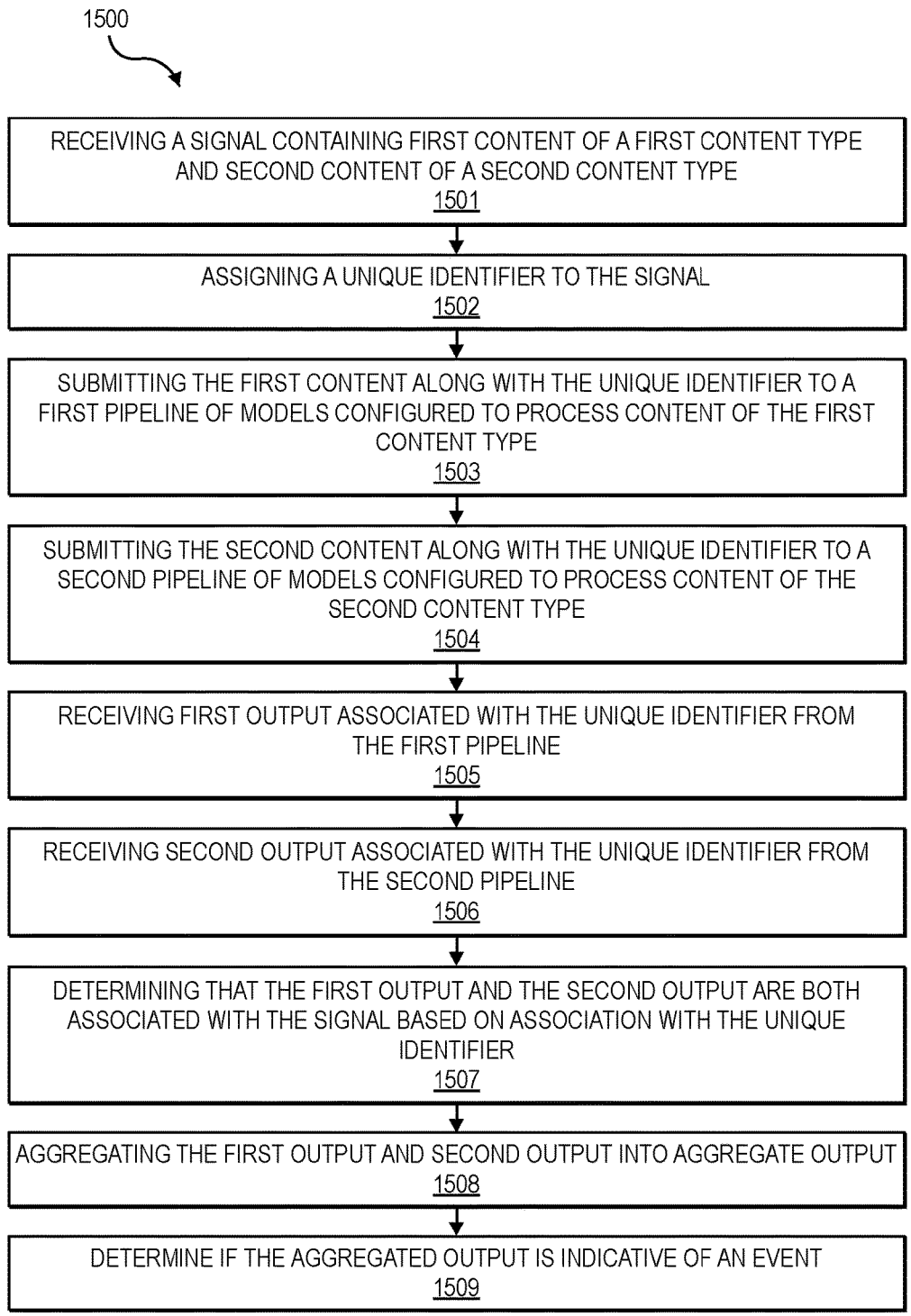
FIG. 15 illustrates a flow chart of an example method for consolidating information from different signals into events.

FIG. 15 illustrates a flow chart of an example method 1500 for consolidating information from different signals into events. Method 1500 will be described with respect to the components and data in FIG. 14.

Method 1500 includes receiving a signal containing first content of a first content type and second content of a second content type (1501). For example, event detector 1404 can receive normalized signal 1422. As depicted, normalized signal 1422 includes text 1427 and image 1428. Method 1500 includes assigning a unique identifier to the signal (1502). For example, event detector 1404 can assign identifier 1442 to normalized signal 1422.

Method 1500 includes submitting the first content along with the unique identifier to a first pipeline of models configured to process content of the first content type (1503). For example, event detector 1404 can submit text 1426 along with identifier 1442 to NLP modules 1434. NLP models 1434 can generate output 1443 from text 1427, for example, a classification and/or score that text 1443 is indicative of a type of event (e.g., fire, accident, police presence, etc.). Identifier 1442 remains associated with output 1443.

Method 1500 includes submitting the second content along with the unique identifier to a second pipeline of models configured to process content of the second content type (1504). For example, event detector 1404 can submit image 1428 along with identifier 1442 to image analysis modules 1436. Image analysis models 14436 can generate output 144 from image 1428, for example, a classification and/or score that image 1428 is indicative of the same type of event as output 143 (e.g., fire, accident, police presence, etc.). Identifier 1442 remains associated with output 1444.

When a normalized signal includes other types of content, the other types of content can be sent to other corresponding model pipelines along with identifier 1442. For example, audio can be sent to audio analysis modules 1437, video can be sent to video analysis modules, etc. The other model pipelines can generate output, for example, a classification and/or score. Identifier 1442 can remain associated with output from other model pipelines.

Method 1500 includes receiving first output associated with the unique identifier from the first pipeline (1505). For example, aggregator 1446 can receive output 1434 along with identifier 1442 from NLP modules 1434. Method 1500 includes receiving second output associated with the unique identifier from the second pipeline (1506). For example, aggregator 1446 can receive output 1444 along with identifier 1442 from image analysis modules 1444.

Method 1500 includes determining that the first output and the second output are both associated with the signal based on association with the unique identifier (1507). For example, aggregator 1446 can determine that output 1443 and 1444 are both associated with normalize signal 1422 based on association with identifier 1442. Method 1500 includes aggregating the first output and second output into aggregate output (1508). For example, aggregator 1446 can aggregate output 1443 and 1444 (e.g., scores, classifications, etc.) into aggregated output.

Method 1500 includes determining if the aggregated output is indicative of an event (1509). For example, aggregator 1446 can detect event 1411 from the aggregated output. Event detection infrastructure 103 can send event 1411 to event notification 116.

In other aspects, the aggregated output is not indicative of an event. In these other aspects, aggregator 1446 does not detect an event from the aggregated output.

In one aspect, multiple pieces of content in a normalized signal, for example, text and an image, each independently indicate an event. However, it may take different amounts of time to process different types of content. Event detector 1404 can cache output from one pipeline for a specified period of time to see if other related content is forthcoming from other pipelines. After the specified period of time, aggregator 1446 can process output from the pipeline so that events are detected in a timely manner.

If another pipeline subsequently generates related output after the specified period of time, aggregator 1446 may detect a duplicate event. However, the duplicate can be deduplicated during subsequent processing, for example, at event notification 116.

Thus, as event detector 1404 detects events, the events can be cached in event holding cache 1106. Events remain in event holding cache 1106 in accordance with event holding criteria 1131. Components of event notification 116 can consolidating signal information and/or deduplicate events.

OTHER ASPECTS

Event detection infrastructure 103 can also include logic to consolidate information in (e.g., deduplicate) multiple signals from the same origin. For example, upon witnessing an accident a person may post essentially the same content (e.g., the same text and same image) to multiple social media platforms. Event detection infrastructure 103 can detect that the multiple signals are related and handle the multiple signals as a single signal.

Event detection infrastructure 103 can also include logic to consolidate/deduplicate reposts, rebroadcasts, etc. For example, a law enforcement entity can issue a warning or notification about an accident. A 3rd party traffic service can subsequently repost the warning or notification. Event detection infrastructure 103 can detect that the content of a signal is a repost of content in another signal. Event detection infrastructure 103 can handle the signal and the other signal as related to the same event. Event detection infrastructure can consolidate information from the signal and the other signal in the same event.

It may be at that aspects of consolidating/deduplicating multiple related signals from the same origin and/or consolidating/deduplicating reposts, rebroadcasts, etc. are implemented at signal ingestions modules 101 and/or at event notification 116.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A computer-implemented method comprising:
   detecting an event from content of a normalized signal, including:
      assigning a unique identifier to the normalized signal;
      submitting a first signal content type along with the unique identifier to a first pipeline of models configured to process content of the first signal content type;
      submitting a second signal content type along with the unique identifier to a second pipeline of models configured to process content of the second content type;
      receiving first output associated with the unique identifier from the first pipeline;
      receiving second output associated with the unique identifier from the second pipeline;
      determining that the first output and the second output are both associated with the signal based on association with the unique identifier;
      aggregating the first output and second output into aggregate output; and
      detecting the event from the aggregate output;
   comparing the event to previously cached events in an event holding cache;
   determining that the event is not a redetection of a cached event;
   caching the event in the event holding cache until a specified holding period expires;
   detecting another event from content of another normalized signal;
   comparing the other event to the event cached in the event holding cache;
   determining that the other event is redetection of the event;
   grouping the event and the other event into an event group;
   publishing the event group, including the event and the other event, to a recipient when the specified holding period expires; and
   removing the event and the other event from the event holding cache concurrently with publishing the event group.

2. The method of claim 1, further comprising caching the event group in a sent group cached until a second specified holding period expires.

3. The method of claim 2, wherein caching the event group in a sent group cache comprises caching the event group in the event group cache concurrently with publishing the event group to the recipient.

4. The method of claim 2, further comprising accessing the holding period and the second holding period from administrator settings.

5. The method of claim 2, further comprising accessing the holding period and the second holding period from recipient preferences.

6. The method of claim 2, further comprising:
   detecting a further event from content of a further normalized signal;
   comparing the further event to one or more event groups cached in the sent groups cache, including comparing the further event to the event group;
   determining that the further event belongs to the event group; and
   publishing the further event to the recipient supplementing publication of the event group.

7. The method of claim 1, further comprising configuring the holding period based on computation processing times.

8. A computer system comprising:
   a processor;
   system memory coupled to the processor and storing instructions configured to cause the processor to:
      detect an event from content of a normalized signal, including:
         assign a unique identifier to the normalized signal;
         submit a first signal content type along with the unique identifier to a first pipeline of models configured to process content of the first signal content type;
         submit a second signal content type along with the unique identifier to a second pipeline of models configured to process content of the second content type;
         receive first output associated with the unique identifier from the first pipeline;
         receive second output associated with the unique identifier from the second pipeline;
         determine that the first output and the second output are both associated with the signal based on association with the unique identifier;
         aggregate the first output and second output into aggregate output; and
         detect the event from the aggregate output;
      compare the event to previously cached events in an event holding cache;
      determine that the event is not a redetection of a cached event;
      cache the event in the event holding cache until a specified holding period expires;

detect another event from content of another normalized signal;

compare the other event to the event cached in the event holding cache;

determine that the other event is redetection of the event;

group the event and the other event into an event group;

publish the event group, including the event and the other event, to a recipient when the specified holding period expires; and remove the event and the other event from the event holding cache concurrently with publishing the event group.

9. The computer system of claim 8, further comprising instructions configured to cause the processor to cache the event group in a sent group cached until a second specified holding period expires.

10. The computer system of claim 9, wherein instructions configured to cache the event group in a sent group cache comprise instructions configured to cache the event group in the event group cache concurrently with publishing the event group to the recipient.

11. The computer system of claim 9, further comprising instructions configured to access the holding period and the second holding period from administrator settings.

12. The computer system of claim 9, further comprising instructions configured to access the holding period and the second holding period from recipient preferences.

13. The computer system of claim 9, further comprising instructions configured to:

detect a further event from content of a further normalized signal;

compare the further event to one or more event groups cached in the sent groups cache, including comparing the further event to the event group;

determine that the further event belongs to the event group; and publish the further event to the recipient supplementing publication of the event group.

14. The computer system of claim 8, further comprising instructions configured to configure the holding period based on computation processing times.

\* \* \* \* \*